United States Patent
Van Genechten

[11] Patent Number: 6,114,956
[45] Date of Patent: *Sep. 5, 2000

[54] DEVICE AND METHOD FOR SENSING AND PROTECTION OF PERSONS AND OBJECTS

[75] Inventor: Fernand Van Genechten, Neuville-en-Condroz, Belgium

[73] Assignee: Belgian Electronic Research S.A.

[*] Notice: This patent issued on a continued prosecution application filed under 37 CFR 1.53(d), and is subject to the twenty year patent term provisions of 35 U.S.C. 154(a)(2).

[21] Appl. No.: 08/351,480

[22] PCT Filed: Jun. 25, 1993

[86] PCT No.: PCT/BE93/00042

§ 371 Date: Feb. 21, 1995

§ 102(e) Date: Feb. 21, 1995

[87] PCT Pub. No.: WO94/00777

PCT Pub. Date: Jan. 6, 1994

[30] Foreign Application Priority Data

Jun. 25, 1992 [BE] Belgium ................................. 9200596

[51] Int. Cl.⁷ .................................................. G08B 13/18
[52] U.S. Cl. ............................ 340/552; 340/554; 342/28; 343/767; 343/771; 343/772; 367/93
[58] Field of Search ..................................... 340/552, 553, 340/554, 541, 567; 342/27–28; 367/93–94; 343/772, 786, 781 R, 767, 770, 771

[56] References Cited

U.S. PATENT DOCUMENTS

| | | | |
|---|---|---|---|
| 3,680,085 | 7/1972 | Del Signore | 342/128 |
| 3,890,615 | 6/1975 | Moran | 342/28 |
| 4,009,476 | 2/1977 | Lutz | 342/28 X |
| 4,197,537 | 4/1980 | Follen et al. | 340/552 X |
| 4,779,240 | 10/1988 | Dorr | 367/93 X |
| 4,910,464 | 3/1990 | Trett et al. | 340/552 X |
| 4,991,146 | 2/1991 | Ransdell et al. | 367/98 |
| 5,150,099 | 9/1992 | Lienau | 340/552 |
| 5,196,826 | 3/1993 | Whiting | 340/554 |
| 5,424,745 | 6/1995 | Fonsny | 342/28 |
| 5,481,266 | 1/1996 | Davis | 342/28 |

FOREIGN PATENT DOCUMENTS

| | | |
|---|---|---|
| 0109552 | 5/1984 | European Pat. Off. . |
| 0440126 | 8/1991 | European Pat. Off. . |
| 2160274 | 6/1973 | France . |

*Primary Examiner*—Thomas Mullen
*Attorney, Agent, or Firm*—Henderson & Sturm LLP

[57] ABSTRACT

An electronic device including a wave transmitter covering a determined spatial sensing field, and a wave receiver for controlling an automatic device; a radiating antenna including a waveguide having lateral faces and slots arranged on one of the lateral faces, wherein the slots radiate in planes substantially perpendicular to a longitudinal direction of the waveguide, and wherein the wave transmitter and the wave receiver are arranged at one end of the waveguide; a matched load arranged at an opposite end of the wave guide; substantially identical reflectors arranged over substantially the whole length of the waveguide, wherein the reflectors extend essentially symmetrically with respect to longitudinal plane of symmetry of the waveguide and making a predetermined angle with one another, and wherein the waveguide and the reflectors are composed of at least one piece.

19 Claims, 22 Drawing Sheets

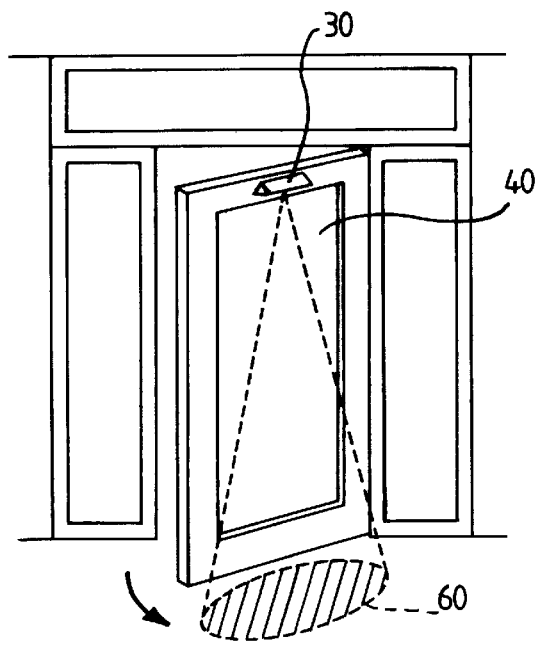
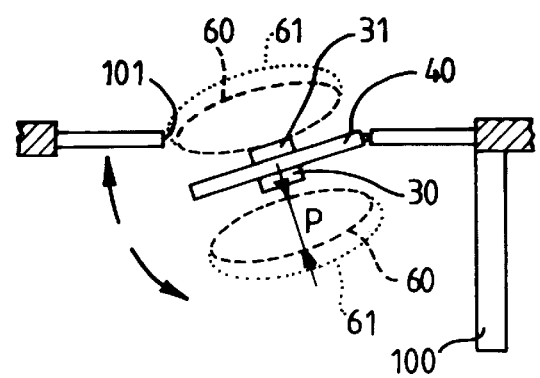
Fig. 13
Fig. 14
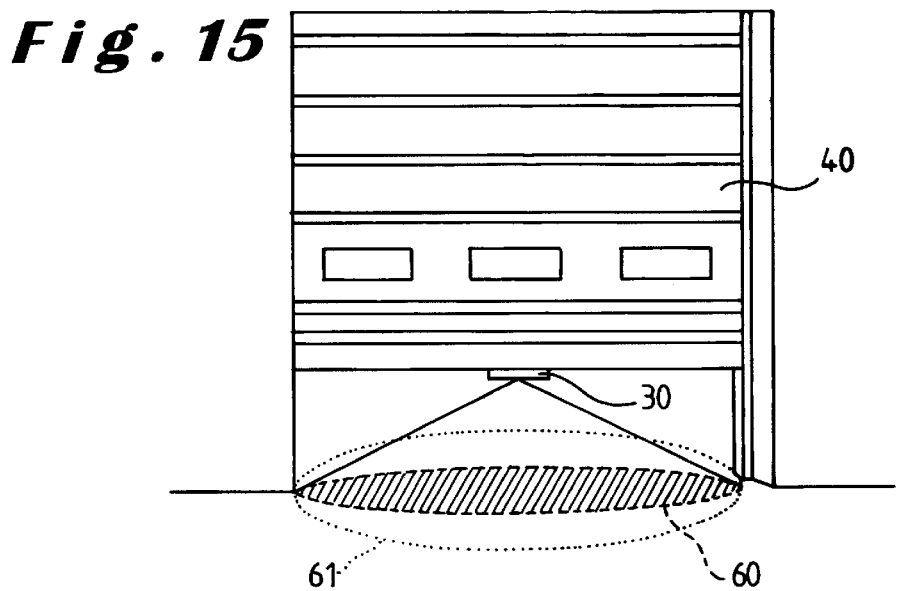
Fig. 15
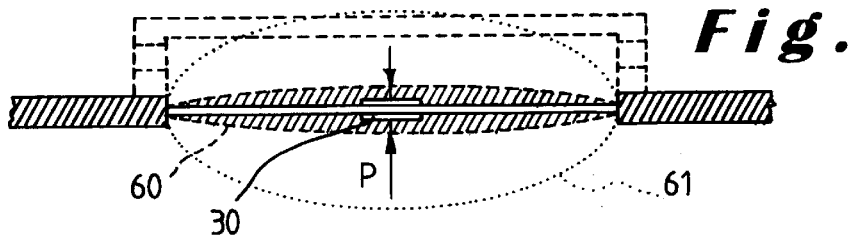
Fig. 16

DEVICE AND METHOD FOR SENSING AND PROTECTION OF PERSONS AND OBJECTS

TECHNICAL FIELD OF THE INVENTION

The present invention relates to electronic devices for sensing and/or protection of persons or objects in the immediate environment of automatic devices, such as automatic doors or potentially dangerous automatic devices, so as to avoid any motion or movement of the latter which may bring about dangerous contact with these persons or objects.

PRIOR ART

Electronic sensors are known which comprise a transmitter for transmitting waves or radiations, such as UHF waves or infrared radiations, and a receiver for detecting the reflected waves or the scattered radiation reflected by an obstacle situated in the spatial field covered, so as to produce a sensing signal depending on the characteristics of the reflected radiation. In this regard, Doppler effect UHF motion sensors, which conventionally installed on the upper part of an automatic door cover a spatial sensing field whose shape and dimensions are determined by the antenna used and which have the function of controlling the opening of the door following the sensing of the motion of a person or object in the sensing field, are known.

Generally, it is desired that the sensing lobe thus developed by the sensor should be relatively broad and that the sensor should sense any motion with equal sensitivity, irrespective of the direction of motion of the person or object with respect to the door.

In certain cases it is desirable, however, for the depth of the sensing lobe projected in front of the door to be further reduced. The case presents itself in particular when the sensor is to control the opening of a door situated in proximity to a sidewalk or in a shopping arcade. It is clearly appreciated, in this case, that the incessant traffic of pedestrians strolling along the sidewalk or in the arcade, without intending to pass through the door, should not cause the untimely opening of the latter.

The same is true when the sensor is to ensure the protection of persons or objects in the immediate approaches to a revolving door, to a pivoting door, or to a slatted or roller shutter door. In this case, the sensor is fixed on the door itself and accompanies it in its motion, whilst monitoring the dangerous environment, that is to say, the space situated in front of the moving leaf for a revolving door or a pivoting door, or the space surrounding the horizontal leading edge of a roller shutter door. In these cases of application, the depth of the sensing lobe should be reduced so as to avoid, during the motion of the door, and hence of the sensor, sensing persons or objects situated outside the danger zones.

Solutions known heretofore and based on the use of special horn antennas, enable Doppler effect UHF motion sensors to develop a relatively shallow sensing lobe. A limit exists, however, to this technology, which does not make it possible to achieve a depth of lobe substantially less than a meter.

What was described above applies also to UHF presence sensors, whose function, contrary to the sensors mentioned earlier, is to sense the presence of a person or object stationary in their sensing field, so as to prevent the door performing a dangerous motion. In these application cases, the zone to be protected should also be of very reduced depth and situated in proximity to the door so as to cover only the danger zone and avoid untimely disabling through the sensing of too far-off a presence.

Other types of sensors, such as active infrared sensors, make it possible, by virtue of an optic consisting for example of cylindrical Fresnel lenses, to sense the presence—and a fortiori the motion—of any being or object in a sensing field of very reduced depth constituting a sensing or protection curtain.

However, it is well known that optoelectronic presence sensors are particularly sensitive to the nature, color and reflective power of the background which they cover and of the target to be sensed. Depending on the fixed triggering threshold, the least unforeseen disturbance brings about unwanted sensing, and thus the untimely opening or disabling of the door, depending on the function of the sensor. The more sensitive the sensor—this generally being desired so that the coverage which it ensures in front of the door extends as near as possible to the ground—the more frequent is the occurrence of this spurious sensing.

Solutions exist in order to limit the above-cited drawbacks. However, they involve digital signal processing, thus raising the price of the sensor.

Other types of presence and motion sensors based on measuring the propagation time of ultrasound waves have, however, some of the above-cited drawbacks, especially unwanted sensings due to the modifying of the sensitivity of the sensor as a function of the climatic conditions (temperature, humidity), sensitivity to vibrations, and air currents, a common situation in the environment of automatic doors.

Within the framework of the particular application cited above, the main drawback presented by this kind of sensor originates from the fact that the sensing lobe has a virtually circular cross section at ground level. Indeed, the sensing lobe is certainly shallow. By contrast, the width thereof is too small to ensure sufficient coverage.

Moreover, the technology of UHF frequencies or ultrasound, such as used heretofore, does not enable the sensor to take into account the angular component of the motion of the person or object sensed. Indeed, once the person or object penetrates into the sensing lobe, the characteristics of the reflected radiation are modified and the sensor sends a signal to the automatic unit controlling the door. This occurs whether the moving agent approaches the door perpendicularly intending to enter it, or whether the agent merely ambles past without intending to enter.

In the case of the sensing of motion in front of a door situated along a sidewalk or a zone or area of heavy pedestrian traffic, the attraction of a sensor capable of discriminating the direction of the pedestrian traffic from the mere presence of pedestrian traffic is clearly appreciated. Indeed, this makes it possible to control the opening of the door only to moving agents traveling in a direction, or possessed of a component of velocity directed, towards the door, and to leave the door closed in the event of traffic parallel to the door.

This particular application could find a solution by virtue of infrared sensors having a matrix array of transmitters and receivers. This matrix array would allow signal processing allied with image processing, from which it would be possible to extract information about the direction as well as the sense of displacement of the moving agent sensed. This processing is, however, far from being straightforward, and can but lead to expensive sensors. Moreover, these sensors are subservient to the technology used, and they are sensitive to a number of factors such as the nature, color and reflective power of the background and of the target to be sensed.

DISCLOSURE OF THE INVENTION

The purpose of the present invention is to remedy the stated drawbacks and it proposes a device for sensing and protection which makes it possible to produce a sensing lobe, of reduced depth.

According to the present invention, there is proposed a device for sensing and protection of persons and/or objects in the immediate environment of an automatic device, for example an automatic door.

The device comprises a wave transmitter covering a determined spatial sensing field and a reflected-wave receiver controlling the automatic device. A radiating antenna consisting of an elongate body has several radiating slots distributed over the length of the elongate body, each radiating slot having a shape and a placement which are determined in such a way that the antenna radiates in planes which are virtually perpendicular to the longitudinal direction of the elongate body. Such a radiating antenna ensures with advantage a sensing in a favored direction.

In one embodiment, the antenna consists of a slotted waveguide which has slots on one of its lateral faces with a wave transmitter/receiver arranged at one end of the waveguide. The slots, also referred to as radiating slots, are inclined by a predetermined angle, preferably alternately in one direction and in the opposite direction so that the radiated waves are in phase. The inclination of the aforesaid radiating slots can vary over the length of the antenna, either from one radiating slot to the other, or in groups of radiating slots.

Over the whole length of a waveguide antenna, substantially identical reflectors are placed and extend virtually symmetrically with respect to the plane of symmetry of the waveguide while making a predetermined angle with one another in such a way as to reduce the depth of the radiation lobe of the antenna.

It should be observed that the sensing device according to the present invention has the advantage of discriminating between the direction and sense of displacement of a sensed moving agent, and thus takes into account the angular component of the displacement. This selective behavior of the sensor according to the invention has the effect of cancelling out the sensing of traffic parallel to the approaches to an automatic door, for example.

In order to make the device usable as a protection system when it is fixed to one or more moving parts of an automatic device, the subject of the invention is also directed to a process for the electronic processing of the electrical sensing signal produced by the receiver incorporated within the sensing device.

BRIEF DESCRIPTION OF THE DRAWINGS

FIGS. 13 and 14 represent schematically an automatic pivoting door equipped with a conventional UHF protection device.

FIGS. 15 and 16 represent schematically a roller shutter door equipped with a conventional UHF protection device.

DETAILED DESCRIPTION

Figure 1:
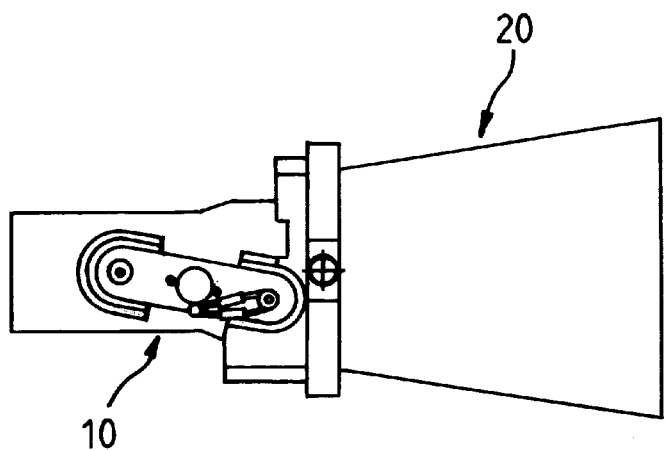
FIGS. 1 to 3 represent schematic views of an example embodiment of the UHF part of a person and/or object sensor.
Figure 2:
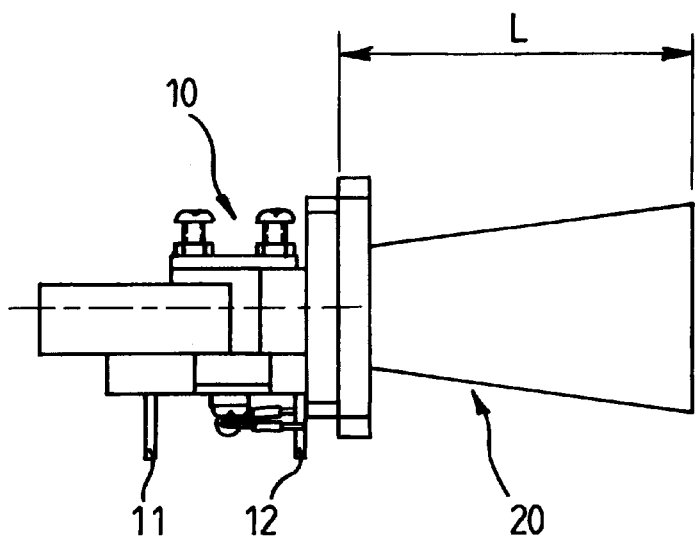
Figure 3:
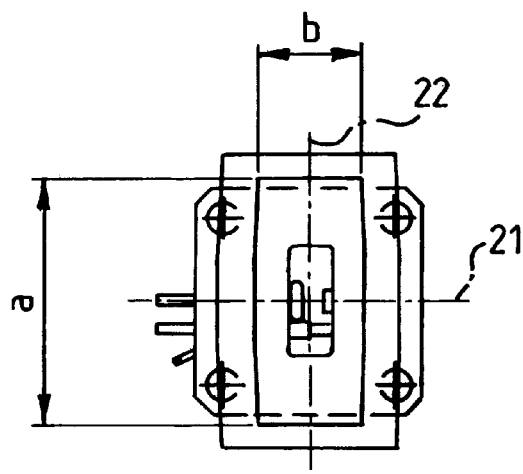

As is conventionally known, a Doppler effect UHF motion sensor is conventionally composed of a UHF part proper, comprising a transmit/receive module and an antenna, as well as an electronic circuit ensuring the supply to the sensor and the processing of the Doppler signal. FIG. 1 is a schematic view of the UHF part of a sensor of the aforesaid type: the transmit/receive module 10 and a horn antenna 20 can be seen. FIG. 2 is a similar view after rotating the assembly by 90° about its longitudinal axis. FIG. 3 represents a front view of the assembly.

The transmit/receive module, conventionally known, for example as shown in FIG. 2 includes a resonant cavity in which a correctly supplied Gunn diode 11 generates a UHF signal which is radiated into space by virtue of the antenna 20. The module works for example at a frequency of 24.125 GHz (K band). It goes without saying however that the description which follows is valid for other frequencies. Only the dimensions of the various constituent elements of this UHF part depend on the frequency of the transmitter/receiver. The horn of the antenna 20 radiates in the two planes containing its axes of symmetry 21 and 22. Any obstacle in relative motion in the field of action of the sensor reflects part of the incident wave and the wave thus reflected is detected by the antenna 20 and mixed with the incident wave by virtue of a Schottky diode 12 correctly stationed in that portion of the waveguide situated between the resonant cavity comprising the Gunn diode 11 and the antenna 20. Consequently, and by reason of the Doppler effect, a low-frequency signal is available at the terminals of the Schottky diode 12. The frequency of the Doppler signal is proportional to the relative speed of the sensed obstacle and its amplitude is proportional to the size and proximity of the sensed obstacle. In the absence of a target in motion in the sensing field of the sensor, the signal at the terminals of the Schottky diode 12 is a noise signal of virtually zero amplitude.

Returning to the example represented in FIG. 1, the Doppler signal available at the terminals of the Schottky diode 12 is fed into an electronic sensing circuit (not represented) capable of producing an active signal for controlling the automatic unit which controls an automatic device, for example an automatic door, when a person or object in motion has been sensed in the sensing field.

Conventionally, the Doppler effect UHF motion sensor, intended in this instance to deliver a sensing signal to the automatic door for example, is stationed in the upper part of the latter and transmits the UHF signal from top to bottom according to a determined angle.

Figure 4:
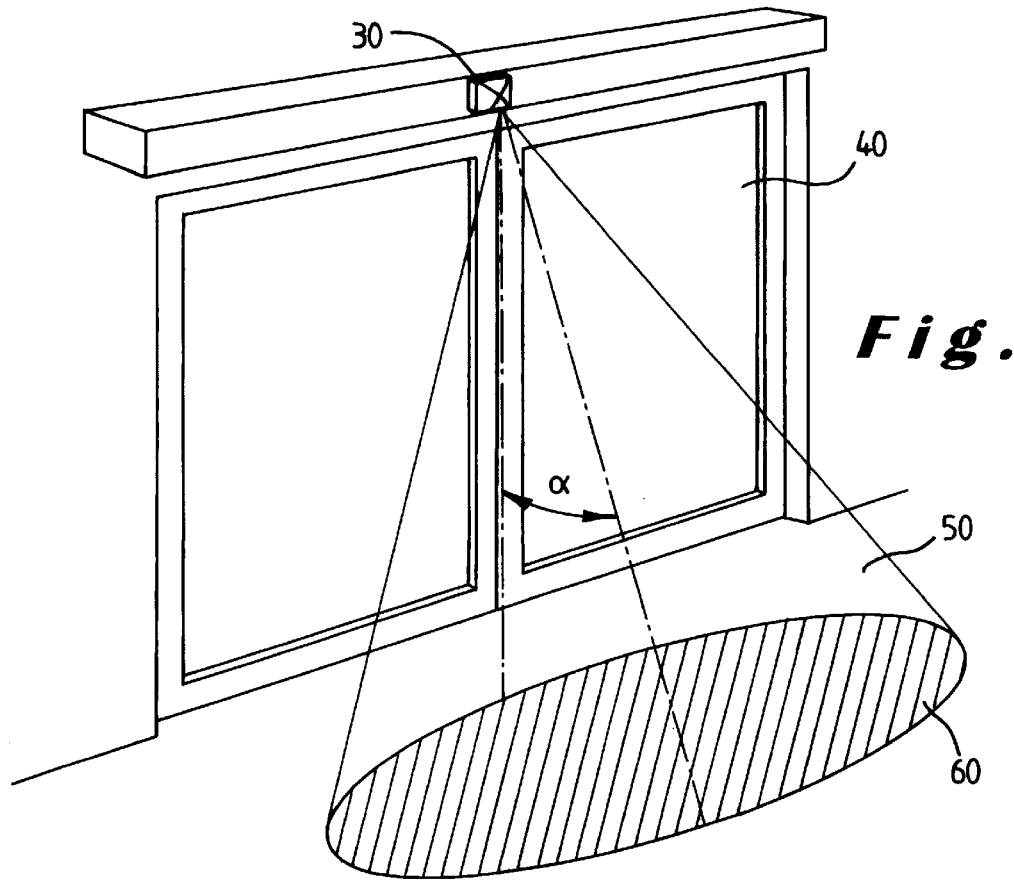
FIG. 4 shows a sensing lobe of a sensor associated with an automatic sliding door.

The portion of space situated in front of the sensor and in which any person or object in motion can be sensed constitutes what is generally called the sensing lobe. FIG. 4 shows the sensing lobe of a sensor 30 associated with a sliding automatic door 40. It takes the form of an oblique cone 50 whose base 60, hatched at ground level, is ellipsoidal in shape. The axis of this cone makes, together with the vertical, a determined angle α. The shape and size of the sensing lobe are imposed by the dimensions of the antenna and by the sensitivity of the electronic sensing circuit.

Figure 5:
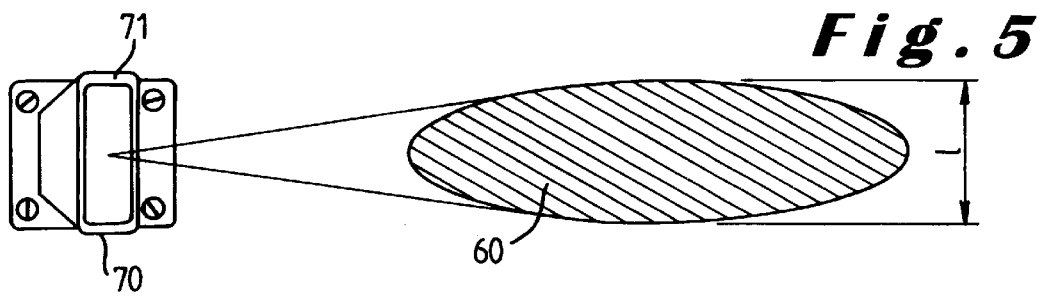
FIGS. 5 and 6 illustrate two examples of sensing lobes transmitted by a horn antenna.
Figure 6:
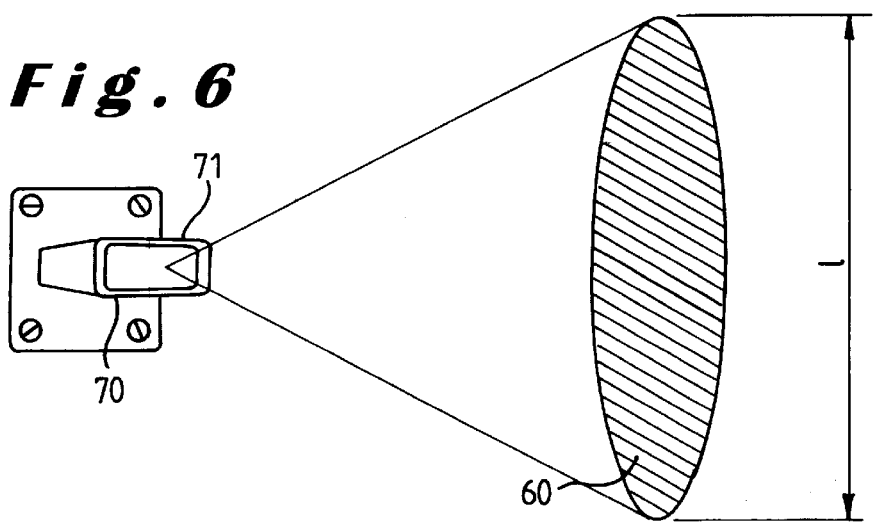

FIGS. 5 and 6 illustrate sensing lobes 60 transmitted by a horn antenna. The radiation characteristics of a horn antenna are such that, the closer together are the opposite panels 70 and 71 of the antenna, the larger is the width l of the corresponding lobe 60, and vice versa. It is therefore seen that it is straightforward, on the basis of the same antenna of rectangular cross section, to generate a narrow, deep sensing lobe 60 (as illustrated in FIG. 5) or, on the other hand, a wide, shallow sensing lobe 60 (as illustrated in FIG. 6). To do this it suffices to perform a 90° rotation on the UHF part of the sensor, or even on the sensor itself, so as to present the antenna with its opposite panels 70 and 71 close together in order to develop a wide lobe 60 (FIG. 6) or with its opposite panels 70 and 71 separated in order to develop a narrow lobe 60 (FIG. 5).

Figure 7:
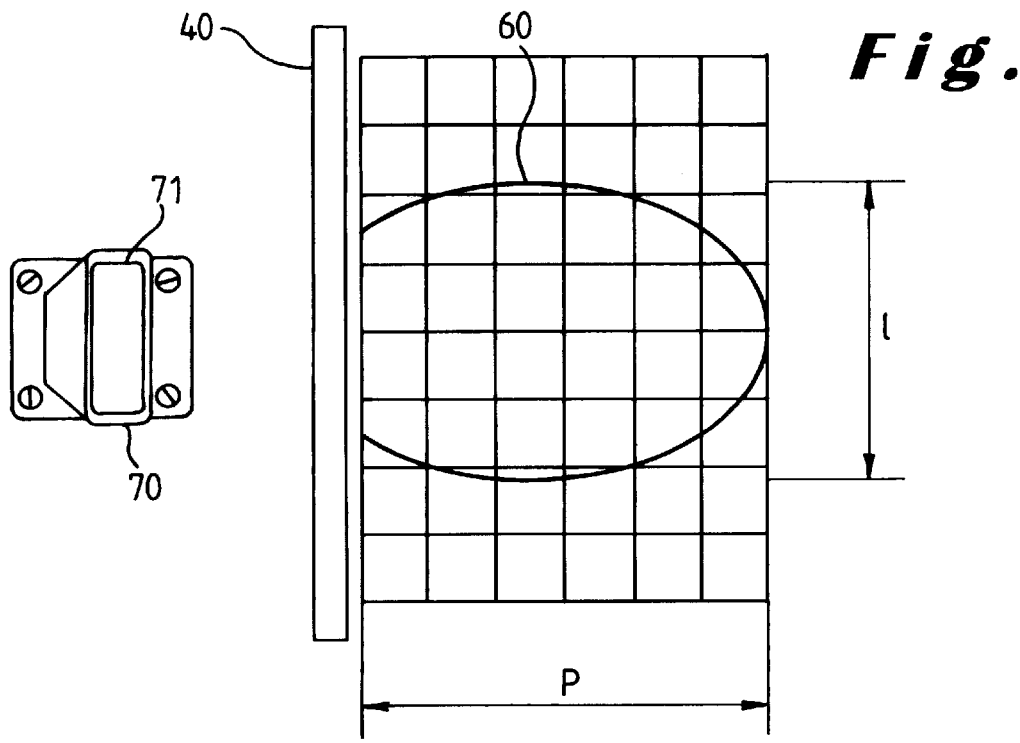
FIGS. 7 and 8 represent the sensing lobes at the approaches to an automatic door equipped with a horn-antenna sensor.
Figure 8:
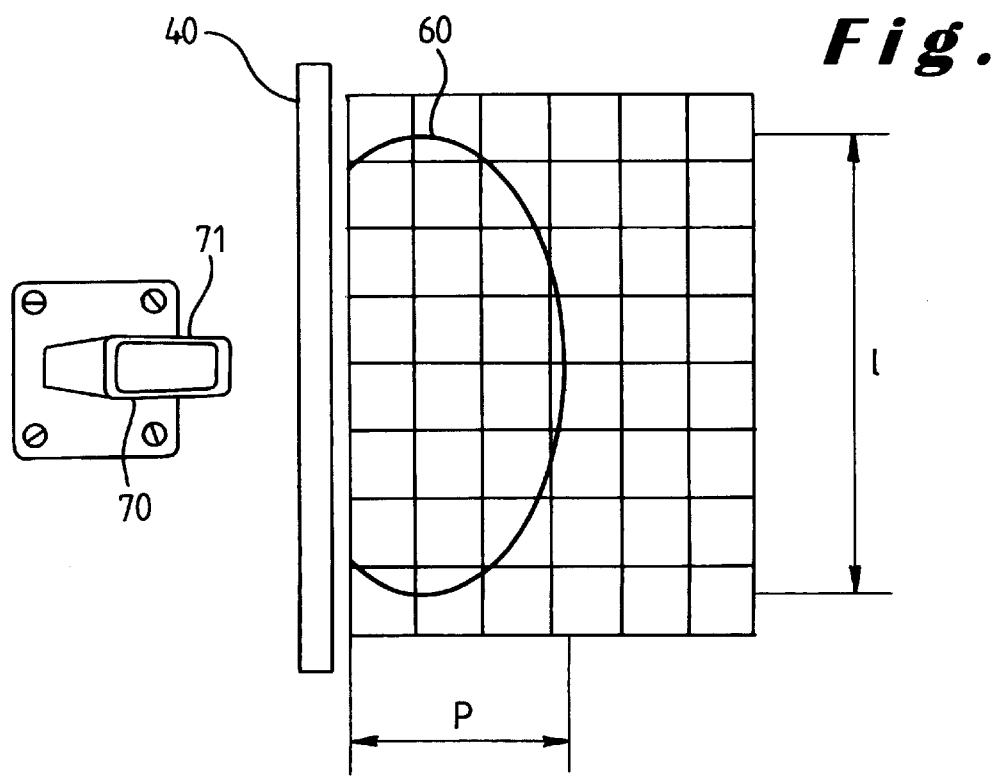

In practice, it is convenient to represent the sensing lobe at the approaches to an automatic door by a plan view corresponding to the intersection of the sensing lobe with the plane of the ground. The curve traced is virtually ellipsoidal in shape, as represented in FIGS. 7 and 8. Found therein by way of example are the plan view 40 of a sliding door, and the ground lobes 60 for two orientations of the antenna. FIGS. 7 and 8 correspond to a UHF motion sensor working at a frequency of 24.125 GHz, furnished with a horn antenna whose dimensions (see FIGS. 2 and 3) are a=21 mm, b=7 mm and L=32 mm, this corresponding to an antenna gain of around 10 dB. The sensor is stationed at a height of 2.20 m above the ground. FIG. 7 corresponds to the case where the antenna is presented with its opposite panels 70 and 71 far apart, thus enabling it to develop a narrow lobe, for example 2.20 m wide and 3 m deep. FIG. 8 corresponds to the case where the antenna is presented with its opposite panels 70 and 71 close together, thus enabling it to develop a wide lobe, for example 3.40 m wide and 1.60 m deep.

The dimensional considerations relating to the sensing lobes developed by Doppler effect UHF motion sensors apply equally to UHF sensors capable of sensing, in addition to the motion, the presence of persons or objects stationary in their sensing field. In this case, the processing of the signal is fundamentally different than the processing of the Doppler signal described above, but what was said regarding the lobes developed by horn antennas remains valid in this application case.

Figure 9:
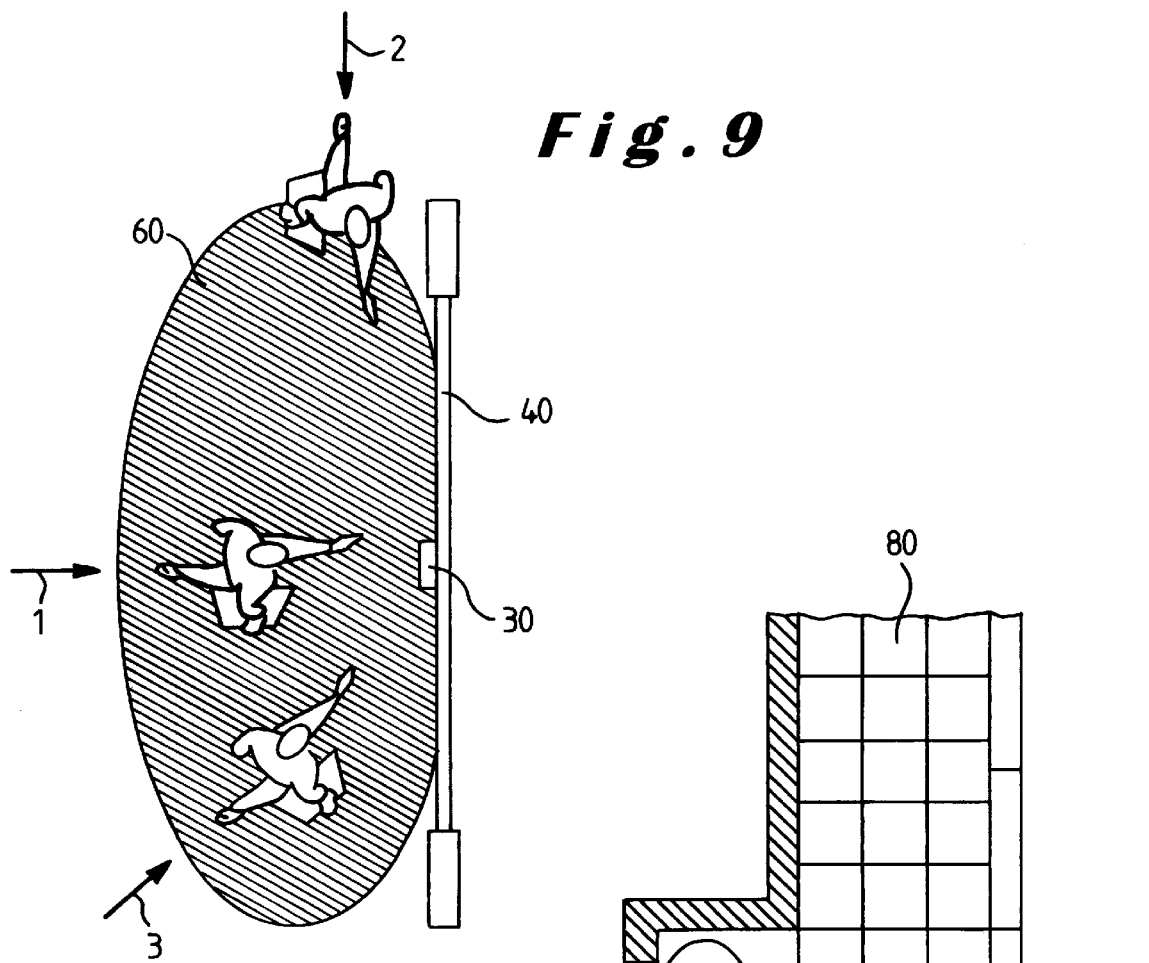
FIG. 9 shows in a plan view the progress of pedestrians in the approaches to an automatic door.

The sensing procedure entails any person or any object in motion being sensed irrespective of their angle of approach relative to the sensor, as illustrated in FIG. 9, wherein is found a transverse sectional view of a sliding automatic door 40 equipped with a sensor 30 developing a sensing lobe 60. The pedestrian 1, approaching the door perpendicularly, is sensed equally as well as the pedestrian 2 walking parallel to the door, and as the pedestrian 3 approaching the door obliquely. For an automatic door situated in front of a very clear space, this method of sensing is very appropriate and leads to efficient opening of the door.

Figure 10:
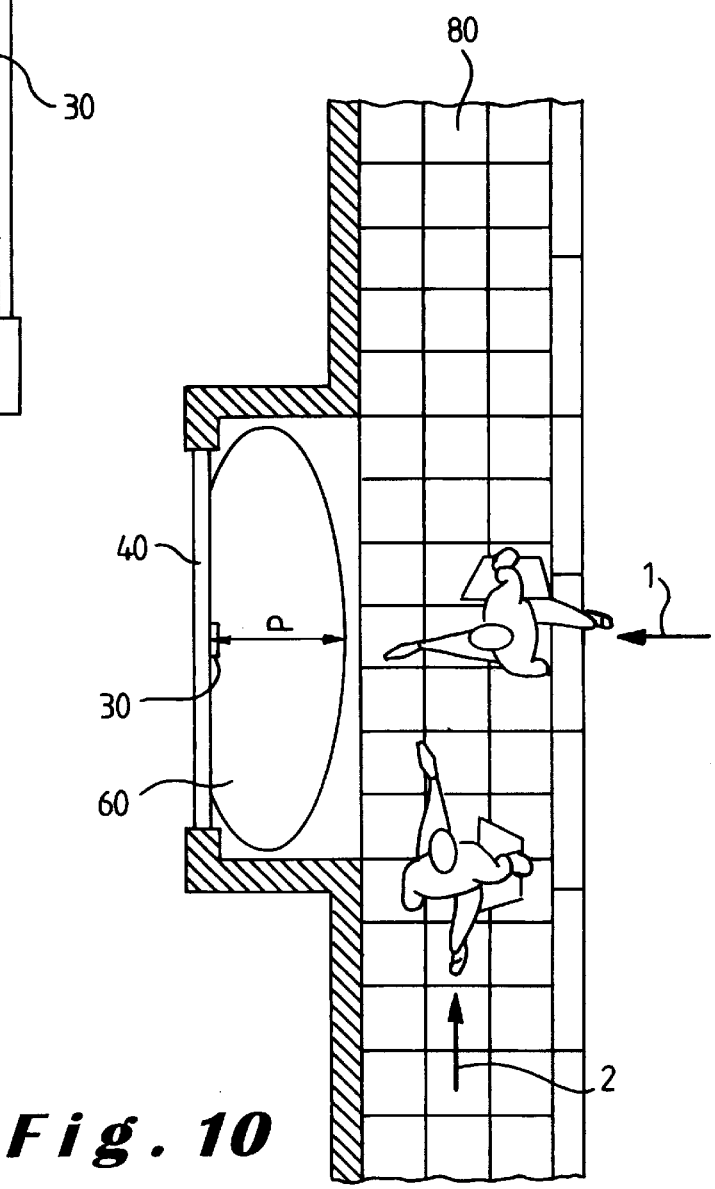
FIG. 10 illustrates the sensing of a pedestrian in the environment of an automatic door at a sidewalk verge.

However, a number of application cases require the sensing lobe developed by the sensor to be relatively shallow. This is for example the case for Doppler effect UHF motion sensors intended for controlling an automatic door 40 placed along a sidewalk 80 or a shopping arcade. FIG. 10 shows how the incessant traffic of pedestrians such as 2, strolling along the sidewalk without intending to pass through the door, should not cause the opening of the latter, whereas pedestrians such as 1 should be sensed. A solution to this problem consists in employing the sensor 30, developing a lobe 60 which is wide but of reduced depth and is generally contained within the space separating the door from the sidewalk proper. A better solution would consist in endowing the sensor with an extra function making it insensitive to any motion parallel to the plane of the door, but this would increase costs.

Figure 11:
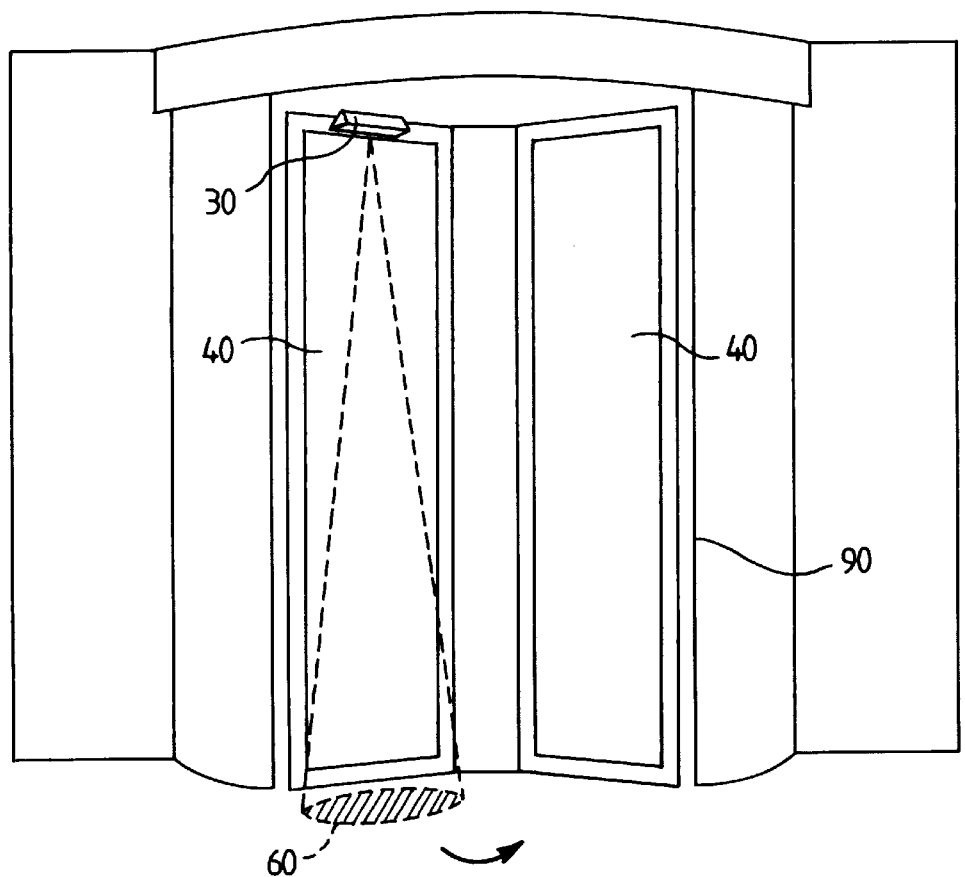
FIGS. 11 and 12 represent schematically an automatic revolving door equipped with a conventional UHF protection device.
Figure 12:
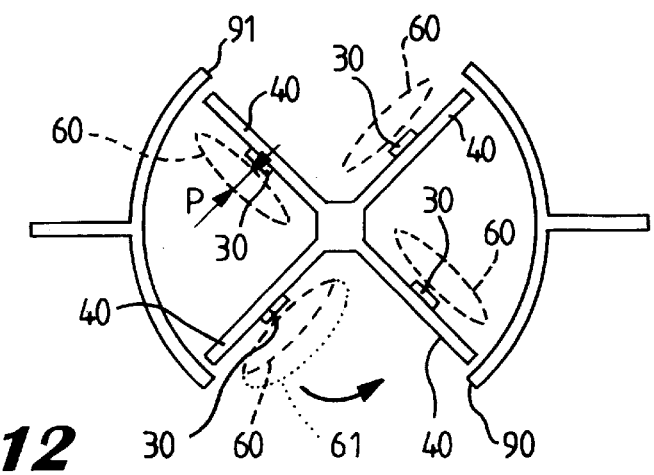

This is also the case for UHF sensors intended to ensure the protection of persons in front of the moving leaves of a revolving door, as illustrated in FIGS. 11 and 12. The sensor 30 is fixed to the upper part of a leaf 40 and it directs its sensing lobe 60 from top to bottom. The sensing procedure should bring about the slowing down of, or even stopping, the revolving door when a person moves into the latter at a speed below the tangential speed of the leaf, and when they are at the point of being caught up with and hit by the leaf preceding them, with consequences which may be damaging. Since the sensor, fixed to each leaf, accompanies the latter in its rotational motion, it is desirable for the depth of the sensing lobe, measured at ground level, to be relatively reduced. This makes it possible on the one hand to sense persons advancing at normal pace into the sectors of the revolving door, and on the other hand not to sense insignificant obstacles. Thus, as can be seen in FIG. 12, a sensor developing a deeper sensing lobe, such as 61, would bring about the undesired sensing of the fixed edges denoted 90, 91 of the outer envelope of the revolving door.

A case very similar to the previous one is that of UHF sensors intended to ensure the protection of persons in front of or behind the moving leaf of a pivoting door, as illustrated in FIGS. 13 and 14. The sensor 30 is fixed to the upper part of the leaf 40 and it directs its sensing lobe 60 from top to bottom. The sensing procedure should bring about the slowing down of, or even the stopping, the pivoting door when a person is moving nearby while the former is in motion and liable to hit the person with damaging consequences. Since the sensor, fixed to the moving leaf, accompanies the latter in its rotational motion, it is desirable for the depth of the sensing lobe, measured at ground level, to be relatively reduced so as not to sense insignificant obstacles. Thus, as illustrated in FIG. 14, the sensor 30 developing a deeper sensing lobe, such as 61, would bring about the undesired sensing of a wall 100 while the door is still in the opening phase, or, for a sensor 31 situated on the other side of the door, and also developing a deeper lobe, such as 61, the undesired sensing of a fixed upright of the door such as 101.

Another case still requiring the use of a sensor having a shallow sensing lobe relates to the protection of the horizontal lower edge of a roller shutter door. A roller shutter door or sectional door takes the form of a shutter, consisting of sections hinged to one another, moving vertically by translating in lateral guides, and winding up, in its upper part in the manner of a shutter, as illustrated in FIG. 15. The dangerous part of this kind of door is the lower edge thereof. During the drop motion of the door, its lower edge can hit and possibly injure a person standing underneath. Similarly, an object abandoned within the radius of action of the door may be damaged by the latter. Protection of this danger zone can be effected by a sensor 30 fixed under the edge of the roller shutter door 40 and directing its sensing lobe 60 from top to bottom. The sensing procedure should bring about the slowing down of, or even stopping, the roller shutter door in the event of danger. Since the sensor, fixed to the moving door, accompanies the latter in its translational motion, it is desirable for the depth of the sensing lobe, measured at ground level, to be relatively reduced so as not to sense insignificant obstacles. Thus, as illustrated in FIGS. 15 and 16, the sensor 30 developing a deeper sensing lobe, such as 61, would bring about, for example, the undesired sensing of objects or vehicles present near the door, without there being a risk of them being hit, causing an untimely and unjustified stopping of the door.

The list of the examples of the use of sensors having a narrow sensing lobe is obviously not limiting and is not restricted to the sphere of automatic doors. Any similar application should be considered as forming part of the context of the invention which will be disclosed further on.

Figure 17:
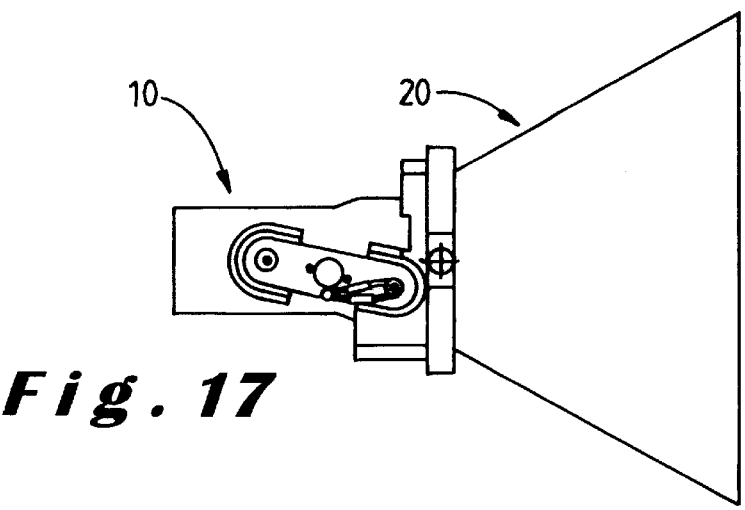
FIGS. 17 to 19 are views, similar to FIGS. 1 to 3, of the UHF part of a sensor, equipped with an antenna sized so as to develop a wide, shallow lobe, or a narrow, deep lobe.
Figure 18:
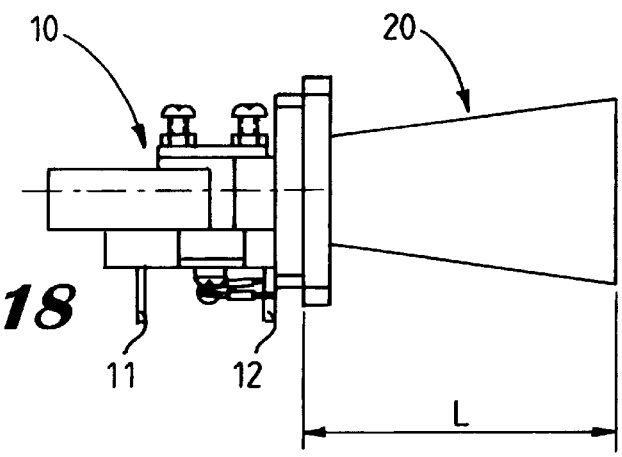
Figure 19:
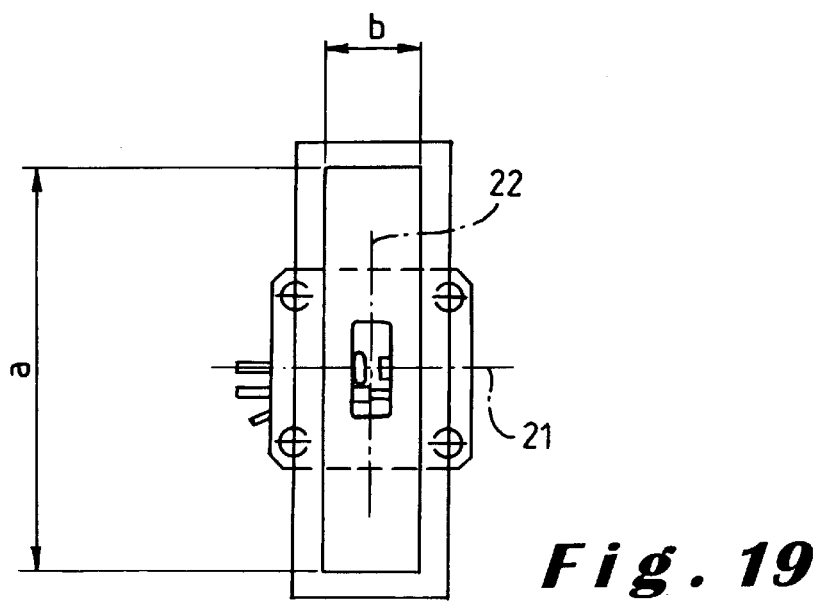

The technology of horn antennas allows partial resolution of the problem of sensing within a shallow lobe. Indeed, the dimensions of the sensing lobe depend strongly on the ratio of the dimensions of the rectangular cross section of the horn antenna. Furthermore, the further apart are the opposite panels, the narrower is the corresponding lobe, and vice versa. The antenna 20 represented in FIGS. 17 to 19, and whose dimensions are, for example, a=50 mm, b=9 mm and L=36 mm makes it possible, depending on its orientation, to develop a wide, shallow or a narrow, deep lobe. In this case also, the transmitter/receiver module 10 works, for example, at a frequency of 24.125 GHz. The gain of the antenna is of the order of 13 dB.

Figure 20:
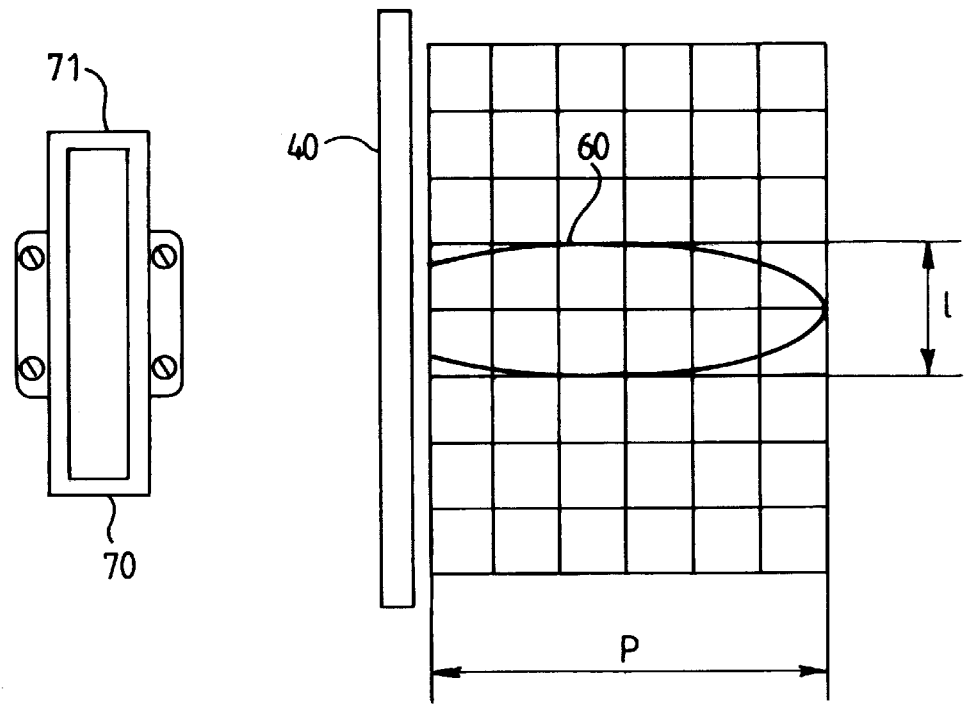
FIGS. 20 and 21 represent sensing lobes developed by the antenna shown in FIGS. 17 to 19.
Figure 21:
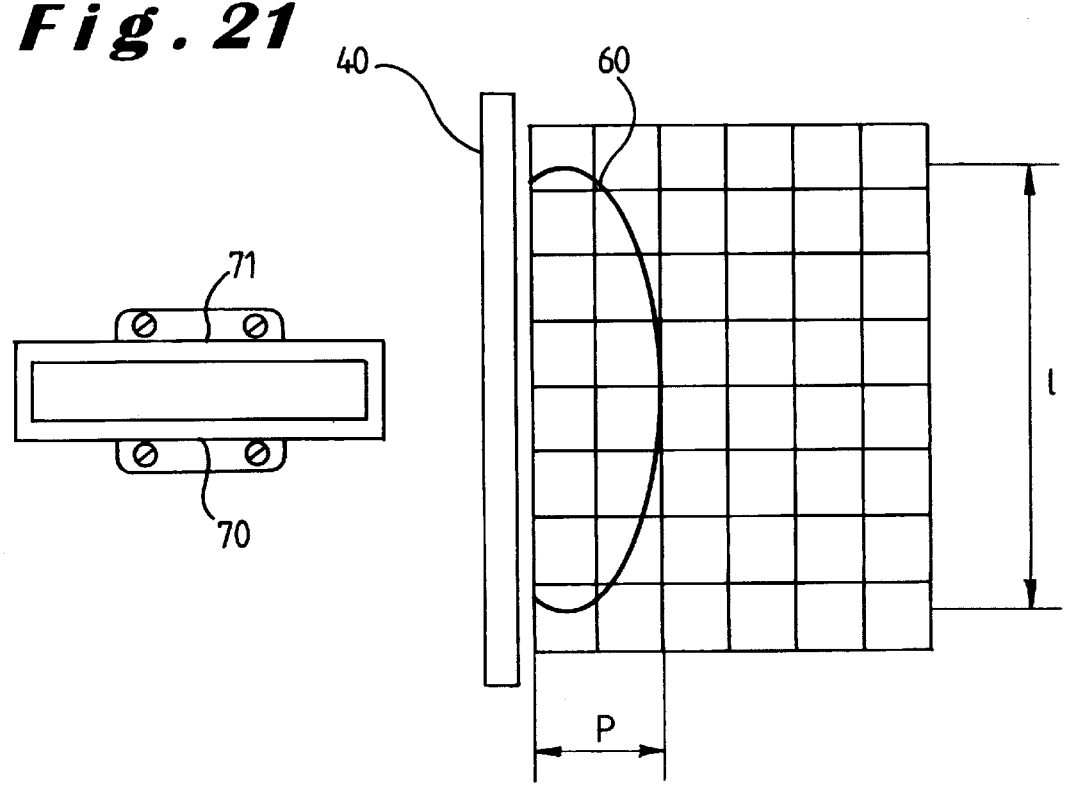

FIGS. 20 and 21 show conventional sensing lobes in the approaches to an automatic sliding door such as they are projected by a horn antenna. The sensor is stationed at a height of 2.20 m above the ground. FIG. 20 corresponds to the case where the antenna is presented with its opposite panels 70 and 71 far apart, thus enabling it to develop a narrow lobe, 1 m wide for example, and 3 m deep for example. FIG. 21 corresponds to the case where the antenna is presented with its opposite panels 70 and 71 close together, thus enabling it to develop a wide lobe, 3.4 m wide for example and 1 m deep.

It is, however, noted that, in the second case, the lobe is scarcely shallower than 1 m. This makes the solution valid, within certain limits, for the solving of the case of sensing along a sidewalk or a shopping arcade, requiring preferably a very shallow sensing lobe. By contrast, this solution would not apply satisfactorily to the examples illustrated by FIGS. 11 to 16. A lobe 1 m deep would certainly bring about untimely sensings. On the other hand, it does not enable the direction and sense of displacement of sensed moving agents to be discriminated. As a result this practical limitation of the technology of horn antennas to lobes having dimensions not less than 1 m deep makes the use of conventional UHF sensors inappropriate in many cases.

As was stated earlier, the foregoing is also valid for UHF presence sensors furnished with horn antennas.

It is certainly currently possible to control, to a certain extent, narrow-lobe sensing with other technologies. The technology of active infrared sensing, for example, proceeds through transmission of infrared radiations in a sensing lobe and through measurement of the scattered radiation reflected by the environment or by any obstacle to be sensed. Sensors based on this technology sometimes have the advantage of sensing the presence of stationary persons or objects. Furnished with correctly dimensioned cylindrical Fresnel lenses, this kind of sensor makes it possible to sense the presence and motion of a person or object in a sensing lobe which is generally wide but of very reduced depth, for example less than 30 cm, and which constitutes a sensing or protection curtain.

Referring to FIGS. 10 to 14, it is apparent that the characteristics of the infrared curtain are perfectly suited to this kind of application. By contrast, the same is not true for the roller shutter door illustrated in FIGS. 15 and 16, given that the useful range of active infrared sensors is often limited to 2.50 m, whereas roller shutter doors are generally greater than 3 m in height, often reaching 5 m.

On the other hand, it is well known that active infrared optoelectronic sensors have a number of flaws inherent in their technology. There is, in particular, some sensitivity to the nature, color and reflective power of the background which they cover, that is to say to the contrasts of the environment which, if it is fluctuating, may bring about a fair number of spurious sensings. Only appropriate signal processing enables these sensors to escape from these flaws, but this is at the cost of some complexity.

Figure 22:
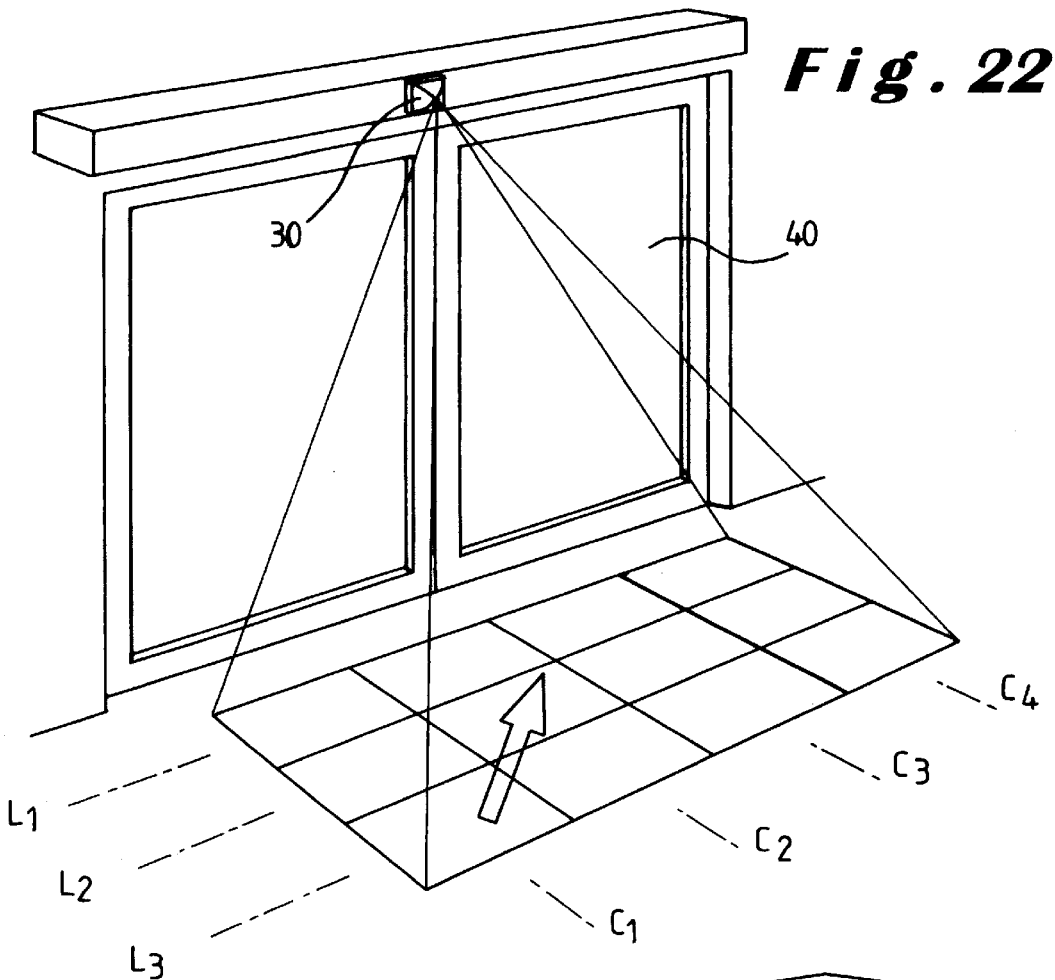
FIG. 22 is an illustration of the matrix lobe developed by an active infrared sensor in front of a sliding automatic door.

Finally, it should be pointed out that a known alternative to the technique of active infrared sensing makes it possible to endow the sensor with a function of taking into account the angle of approach of the agent moving in the sensing field. This constitutes an advantage in the situation illustrated in FIG. 10, where the pedestrians walking along the sidewalk (hence parallel to the plane of the door) without intending to enter, should not be sensed. This technique consists in transmitting infrared radiations in a matrix array of discrete transmitters, for example three rows of four columns, denoted L1, L2, L3 and C1 to C4 in FIG. 22. The sensor 30 is then stationed, for example, in front of a sliding automatic door 40. The transmitters are successively activated by horizontal scanning, L1–C1, L1–C2, . . . , L3–C4, whilst the radiations are reflected by the environment into a matrix array of discrete receivers synchronized with the corresponding transmitters. Signal processing, allied with image processing, makes it possible to extract information about the direction and sense of displacement of the sensed moving agent, represented by the arrow in FIG. 22. This processing is, however, relatively complex and sensors based on this technique are expensive. Moreover, they are affected by flaws inherent in active infrared technology.

Figure 23:
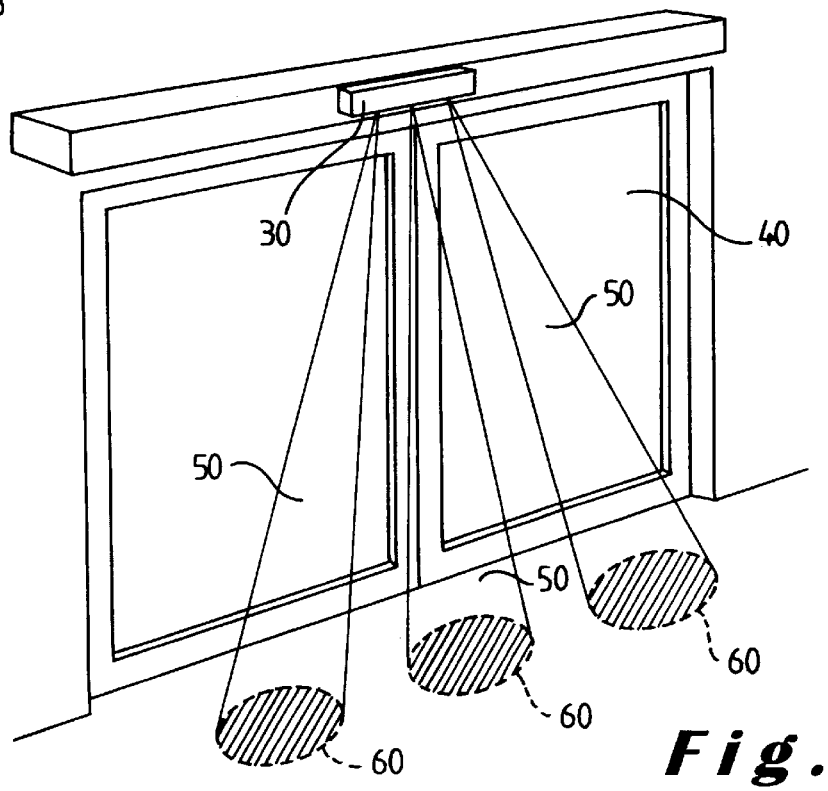
FIG. 23 shows an ultrasound-based multilobe sensing system.

Finally, the technique of presence detection—and a lortiori motion detection—through measurement of the propagation time of ultrasound waves could be suitable in some of the aforesaid application cases. Ultrasound-based sensors have, however, some drawbacks, especially undesirable sensings due to modification of the sensitivity of the sensor as a function of the climatic conditions (temperature, humidity), sensitivity to air currents, sensitivity to vibrations and to mechanical noise, absence of sensing for targets which are not orthogonal or are covered in absorbent materials such as wool or cloth, these situations being common in the environment of an automatic door. The sensing lobe 60 at ground level of such a sensor is generally circular with a fairly reduced diameter of the order of 50 cm, as illustrated in FIG. 23. A multiple sensor 30 is then mounted above the automatic door 40 and it directs its ultrasound beams 50 from top to bottom.

The small size of the lobe is favorable to the application cases illustrated in FIGS. 10 to 16 as regards the depth of the lobes, but it is not appropriate in respect of the width of the lobe, because the sensing lobe is circular. It is, therefore, necessary, in most cases, to use several sensors simultaneously, as illustrated in FIG. 23, so as to extend the lateral coverage. This quite obviously raises the price of the installation. Furthermore, the technique scarcely lends itself to the inclusion of the angular component of the motion of the sensed moving agent.

Finally, in applications in which the sensor moves with the door or a moving element, the vibrations engendered by this motion cannot but render the sensing unreliable.

The present invention affords a solution to the problem of sensing within a lobe of reduced depth, and it proposes a sensing device using an antenna which ensures, in particular, sensing in a favored direction.

The concept on which the invention is based consists in utilizing the technology of UHF frequencies and in profiting from the properties of an elongate radiating antenna having several radiating slots distributed over the length of the antenna and placed in such a way that each of them radiates in a plane which is virtually perpendicular to the longitudinal direction of the antenna.

Figure 24:
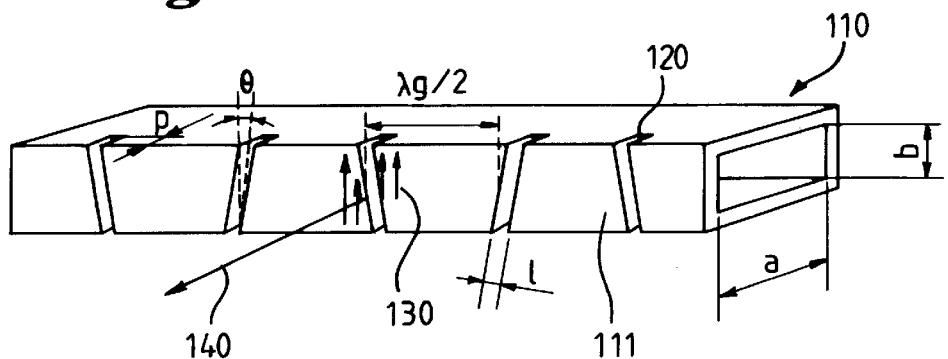
FIG. 24 represents a slotted waveguide.

An example embodiment of an elongate radiating antenna consists of a waveguide antenna with radiating slots, as illustrated for example in FIG. 24. This antenna consists of a rectangular waveguide 110. The dimensions a and b of the latter depend on the frequency of the transmitted wave; and one of the faces 111, generally narrower, is drilled with equidistant slots 120 through which the electromagnetic energy is radiated. The wave transmitted in the guide and radiated through the slots 120 is generated at one of the ends of the waveguide by an appropriate transmitter (not represented in FIG. 24). The slots 120 are regularly spaced apart a distance equal to $\lambda g/2$, where $\lambda g$ is the wavelength of the wave transmitted in the waveguide. Moreover, the slots are inclined alternately by an angle $\theta$ in one direction and in the opposite direction, so that all the slots radiate in phase.

The presence of inclined slots 120 in the small side of the guide 111 interrupts the surface currents 130 arising in the panels of the guide subsequent to the propagation of the wave in the guide. This generates a transverse electromagnetic field whose propagation takes place in a favored direction 140 perpendicular to the small side of the waveguide. For an antenna emitting electromagnetic radiation at a frequency of 24.125 GHz, the standard dimensions of the guide are a=10.668 mm and b=4.318 mm. At the chosen frequency, the wavelength in the guide is 15.303 mm, this corresponding to a separation between the slots of 7.65 mm. The slots have for example a width l=1 mm, their depth p is 1.50 mm, whilst they are inclined by an angle of $\theta=5°$ relative to the vertical.

Figure 25:
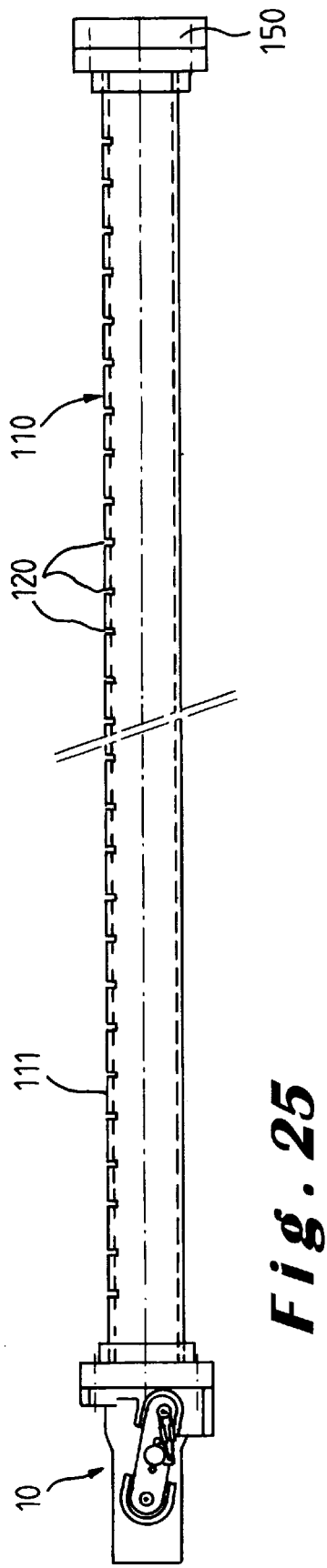
FIGS. 25 and 26 are schematic views of an embodiment of a slotted waveguide antenna according to the invention.
Figure 26:
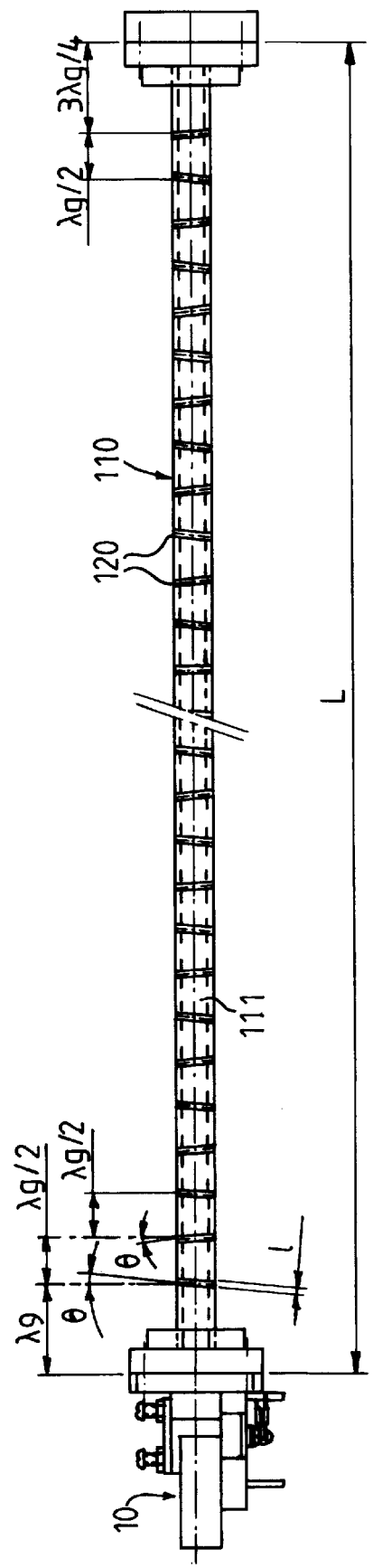

In an example embodiment of the invention, illustrated in FIGS. 25 and 26, one end of the waveguide is supplied by a transmitter/receiver 10, situated a distance equal to $\lambda g$ from the first slot and whose operating principle was described earlier and illustrated in FIGS. 1 to 3. The other end terminates at a matched load 150, consisting, for example, of an absorbent situated ¾ ($\lambda g$) from the last slot. The matching of the terminal load makes it possible to ensure the most uniform possible distribution of radiated power along the guide. Other embodiments of the matched terminal load are possible. The same is true for any variant according to which the radiating slots are cut from the large side of the waveguide.

The slotted waveguide antenna has a length dependent on the frequency emitted and on the number of slots cut in the small side 111 of the guide. By way of example, an antenna working at 24.125 GHz and containing ninety slots has a length L=707.6 mm (see FIGS. 25 and 26). However, greater lengths, on the order of several meters, are perfectly possible to construct.

Figure 27:
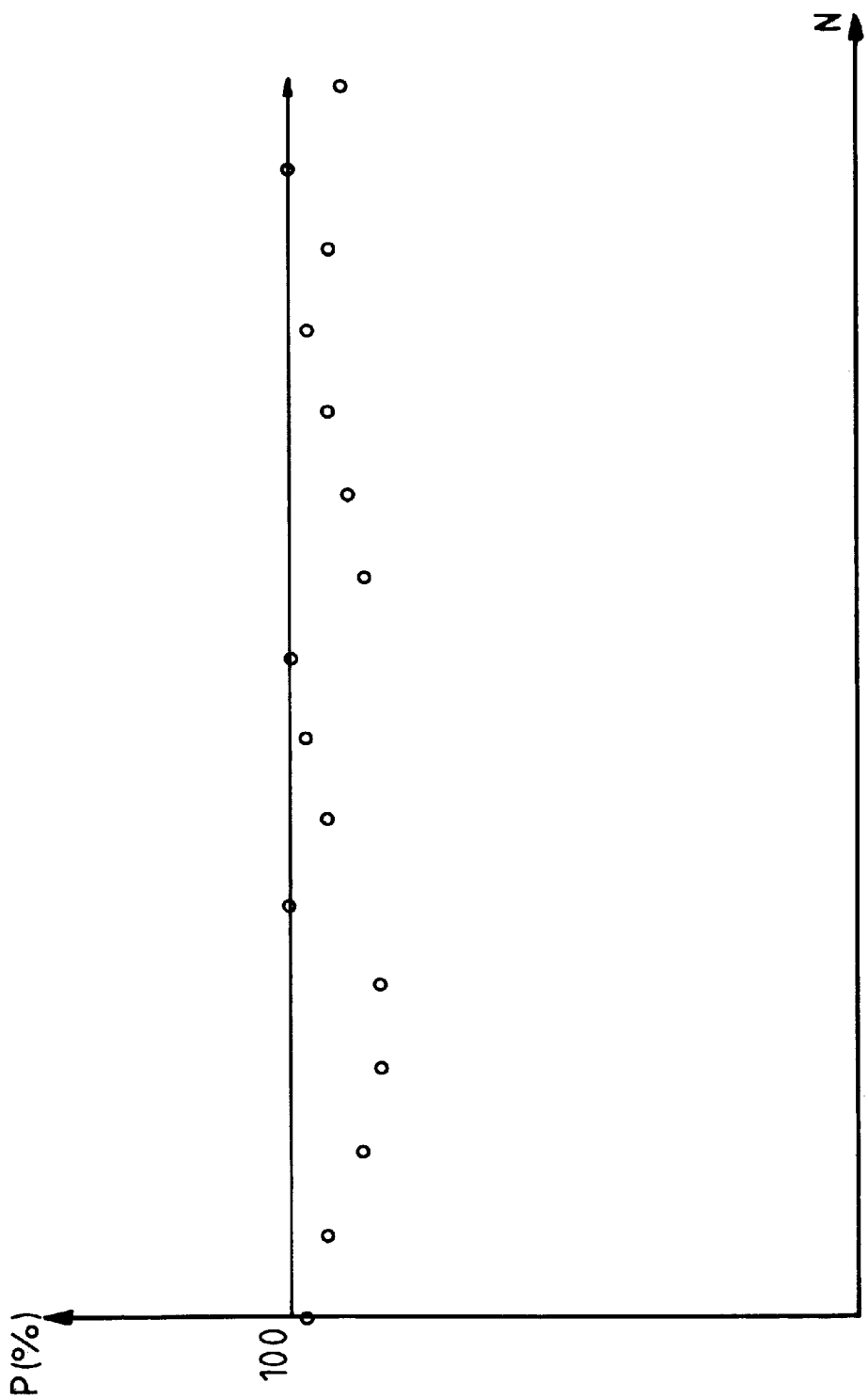
FIG. 27 shows, on a relative scale, the distribution of power along a slotted waveguide antenna.

FIG. 27 represents, on a relative scale, the distribution of power P along a 1.50 m long antenna, with the number N of slots, for example ninety, represented as abscissa. It is noted that the matched load makes it possible to obtain a lobe of very good longitudinal uniformity. As a result, a first condition allowing the application of slotted guide antennas to sensors developing wide, shallow sensing lobes is achieved. Indeed, it is apparent from the applications illustrated in FIGS. 11 to 16, that the lobe developed by the sensor should be as uniform as possible in the width direction, that is to say parallel to the plane of the automatic door.

In the case of a slotted waveguide antenna of great length (e.g. >1 m), it is perfectly possible to optimize the distribution of power radiated along the waveguide by increasing the inclination θ of the slots as a function of their distancing from the transmitter/receiver 10. This modification of the inclination θ of the slots can of course be done in groups of slots: thus, the first $n_1$ slots may for example have an inclination $θ_1$, the next $n_2$ slots have an inclination $θ_2$, with $θ_2 > θ1$, and so on, so as to make the power uniform along the antenna.

The second condition to be achieved by the slotted waveguide antenna is to develop a lobe of very narrow angular aperture, in a plane perpendicular to the axis of the guide.

Figure 28:
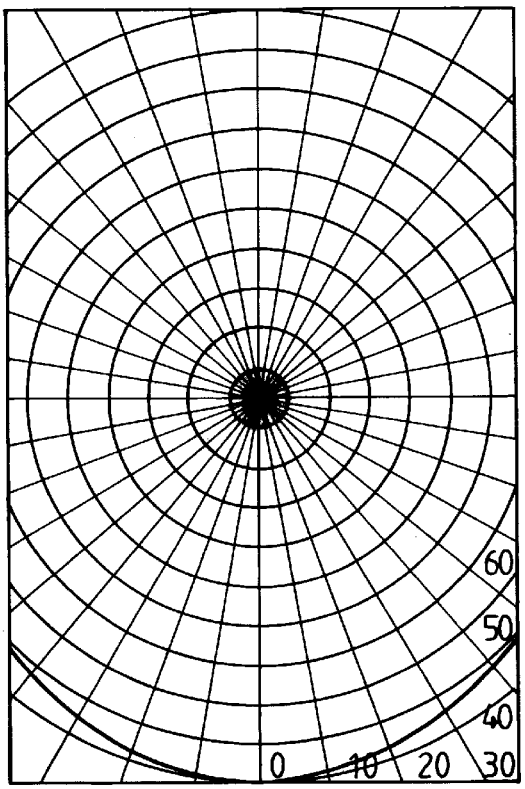
FIG. 28 depicts the polar radiation diagram of the slotted waveguide antenna illustrated in FIGS. 25 and 26.

FIG. 28 shows the polar radiation diagram of the antenna illustrated in FIGS. 25 and 26. The slotted waveguide antenna is assumed perpendicular to the plane of the diagram, at the origin of coordinates, with slots radiating downwards. It is observed, according to measurements made that the antenna radiates in a quasi isotropic manner, thus making the production of a narrow lobe impossible. Indeed, the conventional −3 dB aperture of the measured radiation lobe is 2×30°. Under these conditions and depending on the sensitivity of the sensor, the theoretical depth of the sensing lobe for a sensing height of 2 m could attain a value of 2 m.

Figure 29:
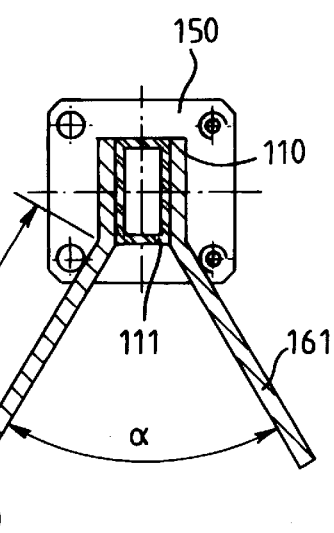
FIGS. 29 and 30 represent, respectively in transverse section and in elevation, the slotted waveguide antenna represented in FIGS. 25 and 26, but furnished with reflectors.
Figure 30:
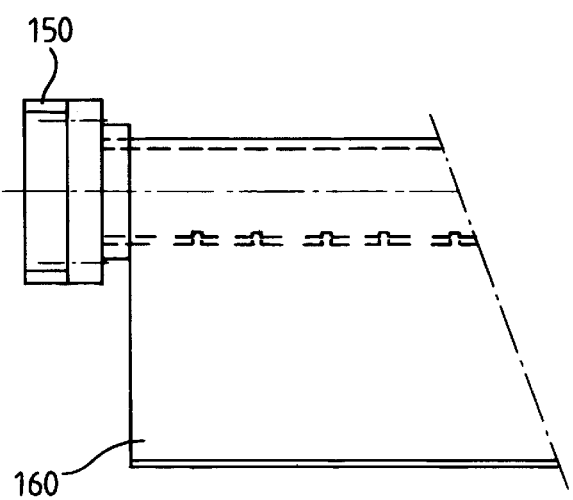

In order to reduce the aperture angle of the radiated lobe in a plane perpendicular to the waveguide, the present invention provides for the use of correctly dimensioned reflectors. These reflectors take, for example, the form of metal plates 160 and 161, secured to the large sides of the waveguide, as illustrated in FIGS. 29 and 30, and make an angle α with one another encompassing the small side 111 of the slotted waveguide. The metal reflectors 160 and 161 can be fabricated from copper or brass plates folded so as to make an angle α with one another, and can be welded to the large sides of the waveguide 110.

Figure 31:
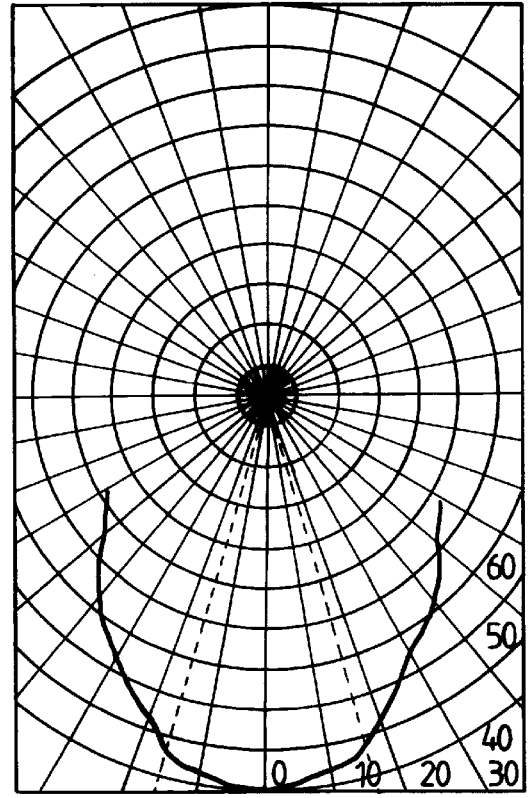
FIG. 31 depicts the polar radiation diagram of the slotted waveguide antenna illustrated in FIGS. 29 and 30.

FIG. 30 represents a side view of the slotted waveguide antenna represented in FIGS. 25 and 26, but furnished with the aforesaid reflectors 160, 161. The latter have an aperture angle α of 53.4° for example and their width C is 30 mm. By virtue of these reflectors, which virtually play the role of the opposite panels 70, 71 of the horn antenna illustrated in FIGS. 5 and 6, the angular aperture of the lobe, in a plane perpendicular to the axis of the guide, is greatly reduced as shown by the polar radiation diagram of FIG. 31. It is observed there that the conventional −3 dB aperture of the measured radiation lobe is reduced to 2×10°. Under these conditions, and depending on the sensitivity of the sensor, the theoretical depth of the sensing lobe for a sensing height of 2 m is less than 0.50 m, this clearly corresponding to the desired objectives for the applications illustrated in FIGS. 11 to 16.

Figure 32:
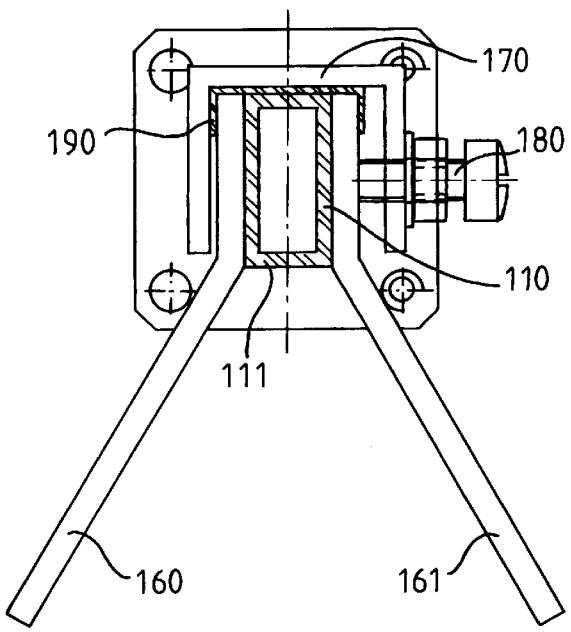
FIG. 32 illustrates a method of fixing reflectors on a waveguide.

Another embodiment and related method of fixing the reflectors according to the present invention consists in fixing the metal plates on either side of the waveguide by virtue of the clipping system illustrated in FIG. 32. A U-member, denoted 170, clamps the two parts of the reflectors 160 and 161 against the large sides of the waveguide 110. Fixing is performed, for example, by press screws 180, regularly distributed along the waveguide. So as to ensure proper electrical continuity between the waveguide 110 and each of the reflectors 160 and 161, a conductive self-adhesive, such as, 190 can be used, as can any other conventional means such as conductive adhesive or paste.

Figure 33:
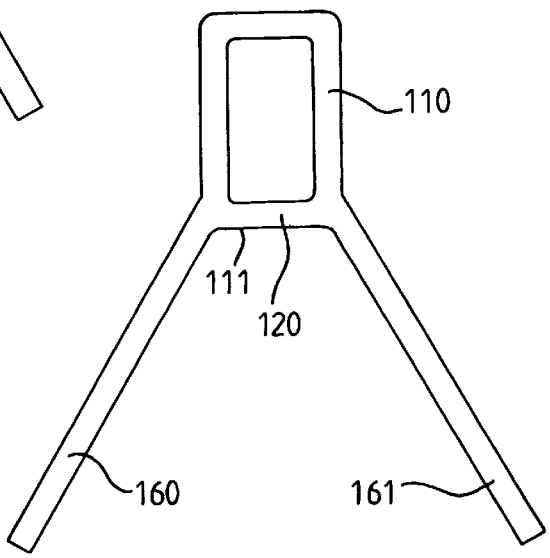
FIG. 33 represents a slotted waveguide antenna with reflectors, the whole formed from an extruded piece.

In another embodiment illustrated in FIG. 33, the waveguide 110 and the reflectors 160 and 161 are formed as a single piece of extruded aluminum for example. The slots 120 (not visible in the drawing) are constructed, for example, by cutting out with the aid of special tooling, or by machining.

Figure 34:
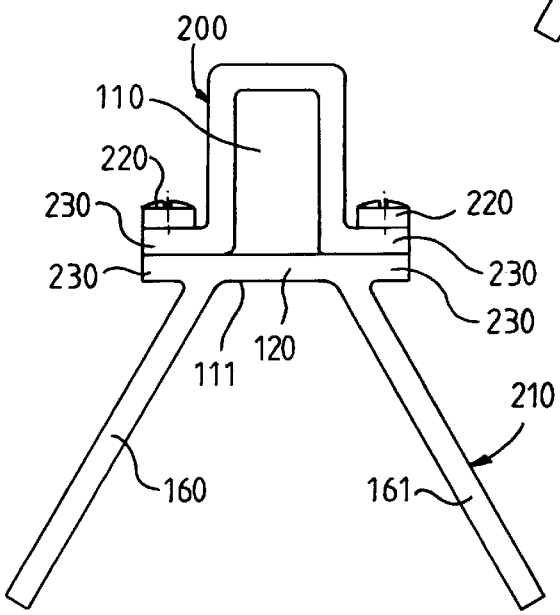
FIG. 34 illustrates an embodiment similar to that illustrated in FIG. 33, but formed of two assembled parts.

Given the small dimensions of the slotted waveguide antenna with reflectors, it may be of interest, in order to accord better accessibility to the tooling for cutting out the slots, to make this extruded aluminum member in two parts denoted 200 and 210 in FIG. 34. Part 200 corresponds to the waveguide 110 proper, whilst part 210 corresponds to the reflectors 160, 161. Being semi-open, the member 210 lends itself more readily to the cutting out of the slots 120, which are not represented in the figure. The two parts 200 and 210 of this embodiment are fixed to one another, for example by means of self-tapping screws 220 placed regularly along the waveguide and screwed into fixing flanges 230. Electrical continuity can be ensured by the aforesaid means 190, such as conductive self-adhesive tape, or conductive adhesive or paste.

In FIG. 34, the fixing flanges 230 have been represented at the level of the plane containing the slots 120. These flanges 230 can be situated at any level along the large sides of the waveguide 110. Other methods of fixing the two parts 200 and 210 of the extruded slotted waveguide antenna (for example welding, adhesive bonding, crimping, grooving and the like) are to be regarded as forming part of the invention.

Figure 35:
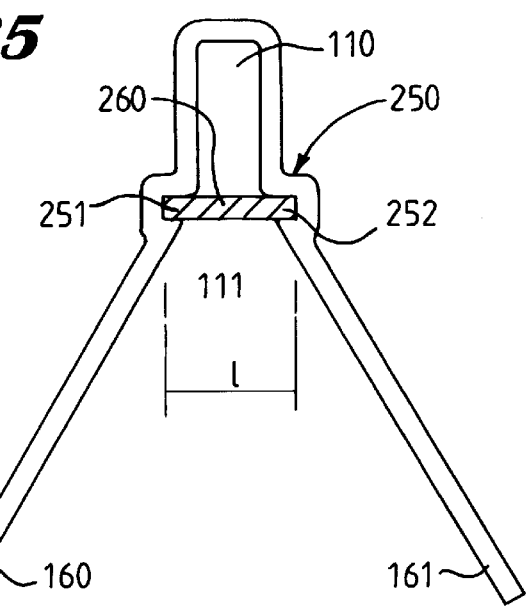
FIG. 35 illustrates another embodiment of an antenna according to the invention.

A particularly interesting embodiment of the slotted waveguide antenna furnished with reflectors consists, according to the invention, in making this device in two parts arranged as described below and with reference to FIG. 35. The first part, denoted 250, consists of a semi-open extruded aluminum member, the bottom 110 of which plays the role of a waveguide part and the sides 160 and 161 of which play the role of reflectors. It is observed that two grooves 251 and 252 facing one another are cut along the whole of the internal part of the member.

The second part, denoted 260, consists of a metal strip inserted into the two grooves 251 and 252. This strip plays the role of the radiating face 111 of the waveguide thus closed, on the condition that the slots (not drawn) are provided, as was stated earlier. This solution has the advantage of simplifying the machining of the slots in the strip 260, insofar as this operation can be performed before insertion thereof into the member, thus ensuring the tooling for cutting the slots optimum accessibility. It is clear that, in this embodiment, the slots will have a length substantially less than the width l of the strip. It has been demonstrated that this did not in any way affect the characteristics of the radiated field.

The strip 260 can be fabricated from a metal flat of extruded copper or aluminum, for example. A particularly advantageous solution consists in using an epoxy substrate covered with a copper metallization, such as used commonly in the manufacture of printed circuits. In this case, the radiating slots can be produced by photo-engraving, a process which is particularly easy to implement, and which leads to an accurate and inexpensive solution.

In the case in which the angle of inclination θ of the slots is to be provided in groups of slots so as to make the radiating power uniform within an antenna of great length, this variation can be effected by threading, into the grooves 251 and 252, successive strips bearing slots having a different angle θ.

Figure 36:
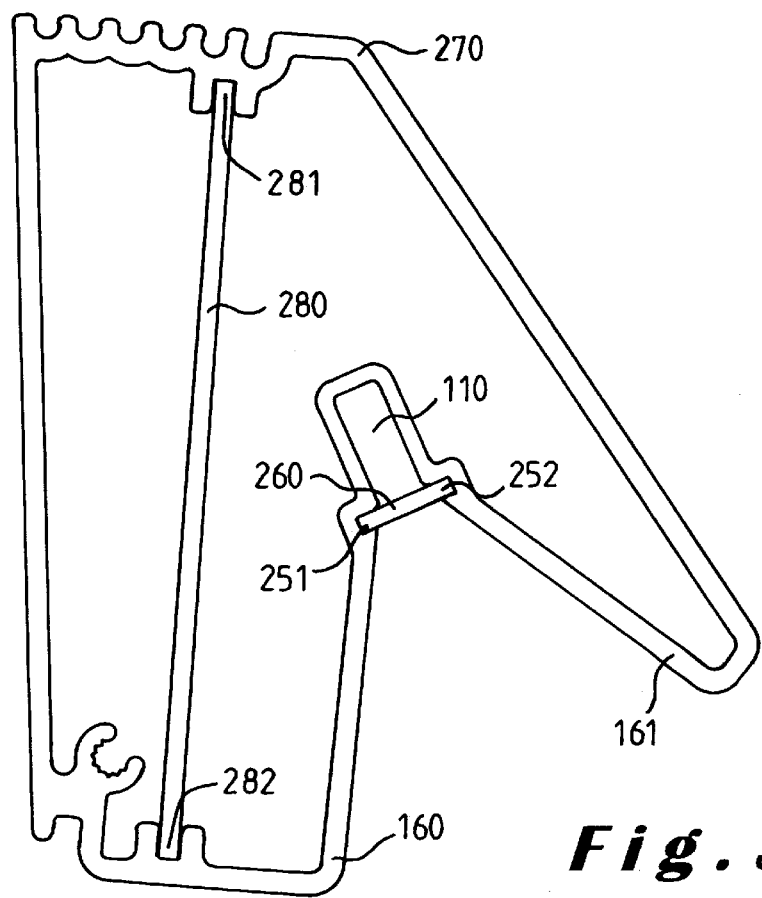
FIG. 36 shows a slotted waveguide antenna according to the invention formed with an extruded casing.

Finally, profit may advantageously be drawn from the use of extruded aluminum members in order to make, in a single piece, according to the invention, the casing of the sensor, the main part of the waveguide and the reflectors: this is illustrated in FIG. 36. The casing of the sensor using the slotted waveguide antenna is labelled 270, the main part of the waveguide is denoted 110 and the reflectors are denoted 160 and 161. As explained earlier, the radiating face of the waveguide consists of a strip 260 inserted into the grooves 251, 252, the said face being drilled with slots, which are not represented in the drawing. The attraction of this placement is that the casing 270 thus constituted can contain other facilities necessary for the operation of the sensor, such as for example a printed circuit 280, inserted into the longitudinal grooves 281 and 282.

To summarize, in one embodiment of the invention, the UHF presence or motion sensor is equipped with a slotted waveguide antenna, which is correctly dimensioned and furnished with an appropriate terminal load so as to render the radiated power as constant as possible parallel to the axis of the guide, and which is endowed with reflectors placed in such a way as to limit the angular aperture of the radiated lobe. These placements make it possible to produce a desired radiation lobe whose width is defined by the context of the application, but whose depth is to be reduced to 0.50 m or less.

Figure 44:
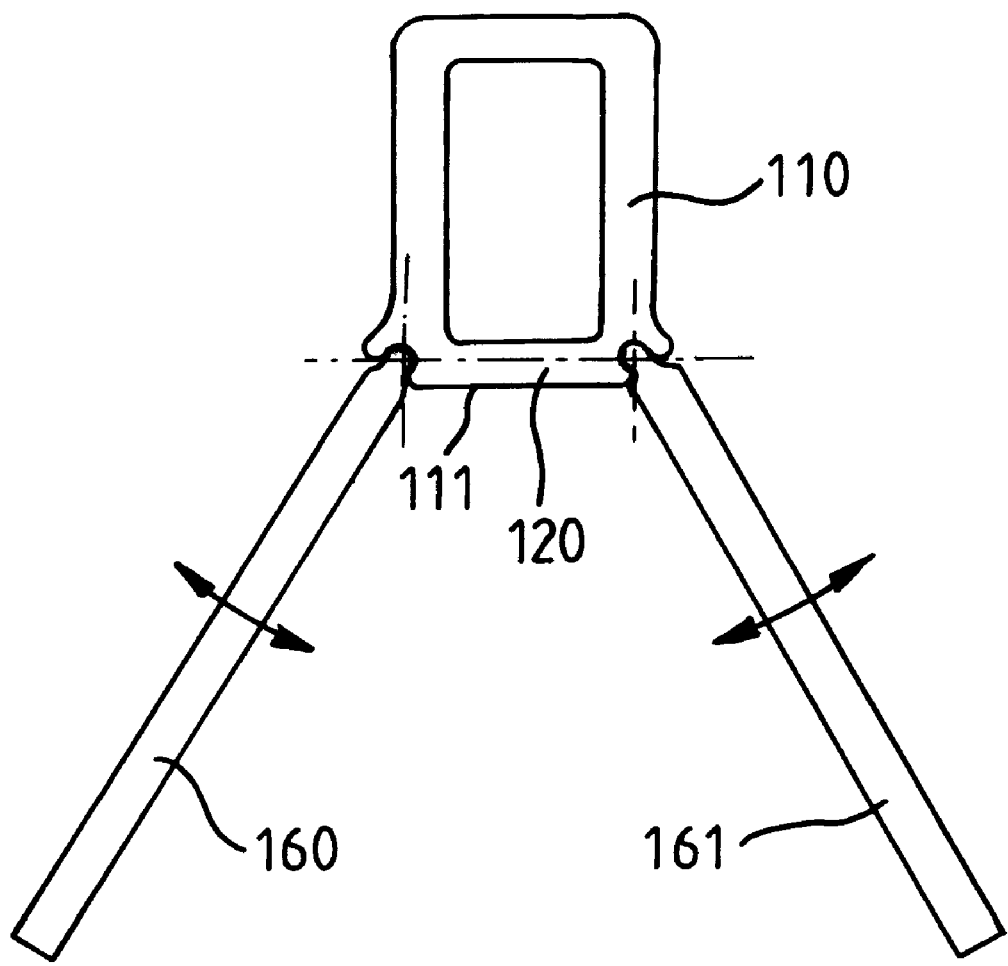
FIG. 44 shows another embodiment of the sensing and protection device of the present invention in which the reflectors are arranged so as to pivot about an axis parallel to the longitudinal axis of the waveguide.

Referring now to FIG. 44, still another embodiment of the sensing and protection device of the present invention is shown in which the reflectors (160, 161) are arranged so as to pivot about an axis parallel to the longitudinal axis of the waveguide (110). Axis (290) and axis (291) are parallel to the longitudinal axis of the waveguide (110). Reflector (160) pivots with respect to axis (290). Reflector (161) pivots with respect to axis (291). The pivoting of one structure with respect to another can be accomplished by any of a multitude of ways which are well known.

Figure 37:
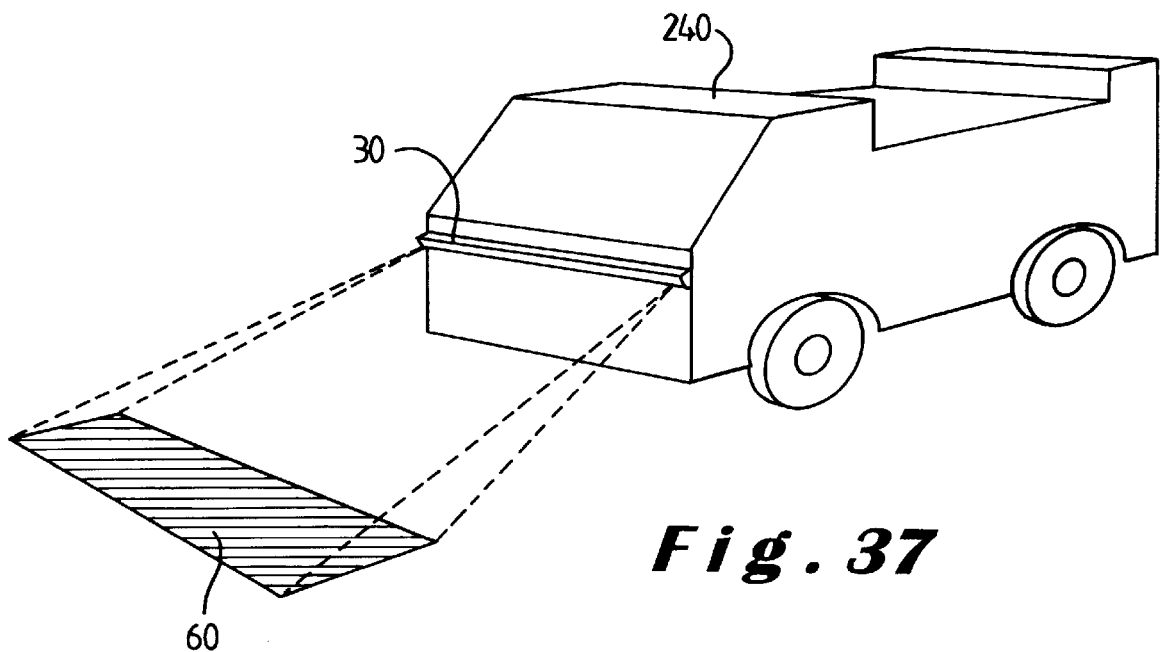
FIG. 37 is a schematic representation of an automatic transport vehicle equipped with a sensor with antenna according to the invention.

FIG. 37 illustrates the case of an automatic transport vehicle 240, for example a wire-guided cart. The vehicle is equipped with a sensor 30 furnished with a slotted waveguide antenna such as described earlier. By virtue of the device according to the invention, on the one hand, the width of the sensing lobe 60 can be matched to the width of the vehicle and is proportional to the length of the waveguide employed and, on the other hand, the depth of the lobe projected in front of the vehicle is sufficiently reduced, by virtue of the reflectors used, to avoid premature sensings, especially when the vehicle changes direction.

It should be observed that with an antenna according to the invention, the main direction of radiation indicated by the arrow 140 in FIG. 24, is perpendicular to the small side of the waveguide, and hence perpendicular to the sensor itself. However, transverse components also exist, but they are of far lower amplitude than the amplitude of the component 140 of the electromagnetic field. Thus, the invention makes it possible to produce a UHF motion sensor having a favored sensing direction.

Figure 38:
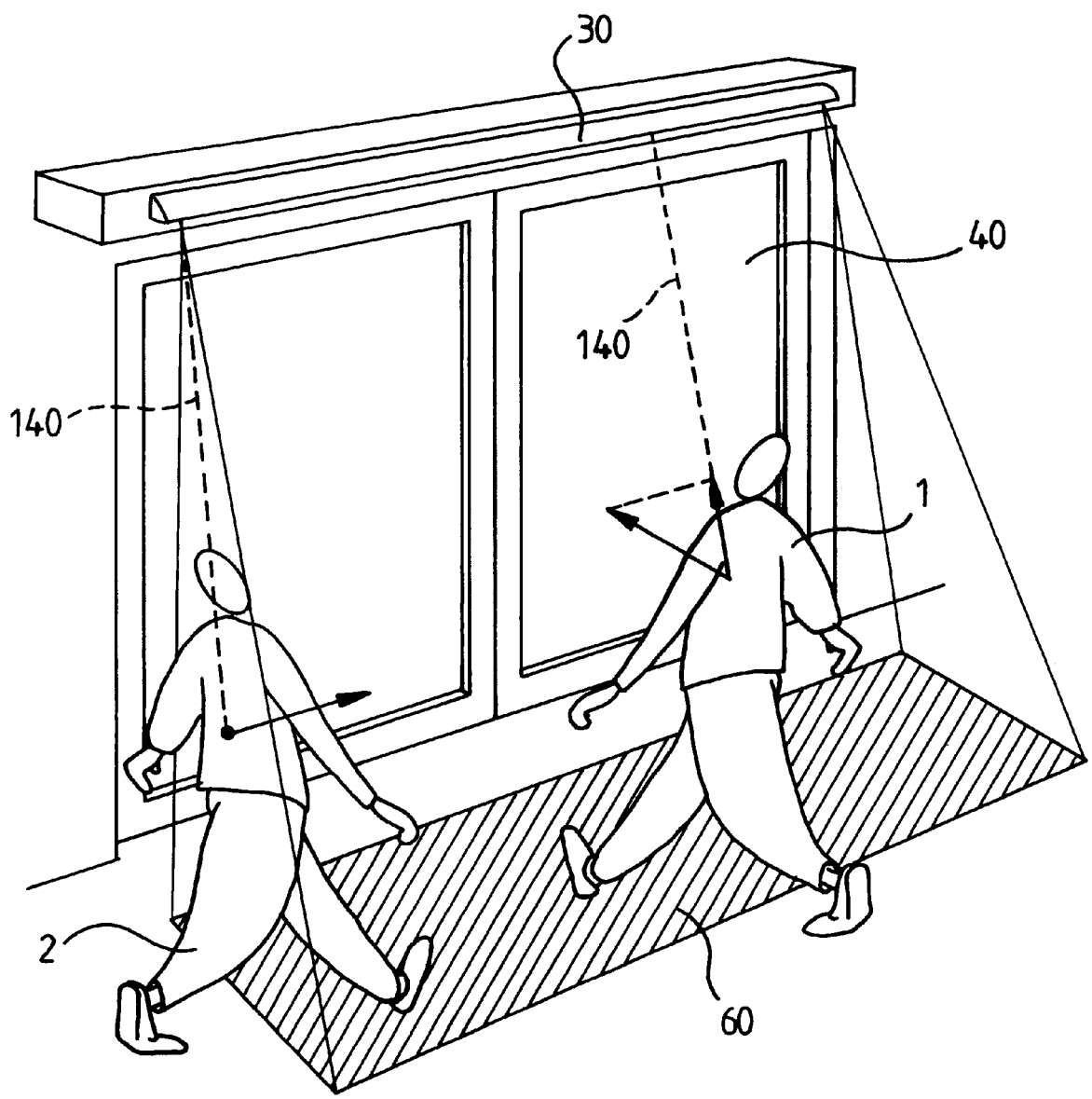
FIG. 38 represents a sliding automatic door equipped with a sensor according to the invention.

FIG. 38 represents a sensor 30 according to the invention placed on a sliding automatic door 40. This sensor develops a sensing lobe denoted 60 at ground level. As a result of the foregoing, it will thus be possible to sense only moving agents possessed of a component of velocity perpendicular to the sensor, that is to say along the directions denoted 140. The pedestrian 1, who is approaching the door virtually perpendicularly thereto, will be sensed whilst the pedestrian 2, who is moving parallel to the door will not. Nevertheless, if during his movement, the pedestrian 2 bends his course towards the door, he generates a component of velocity towards the sensor and he will be sensed. This selective behavior of the sensor according to the invention is highly desirable when the sensor is installed for example on a door close to a sidewalk or a shopping arcade. In this case, the sensing of parallel traffic constitutes a nuisance, insofar as the pedestrians who are strolling parallel to the door do not generally intend to enter therethrough.

Naturally, the invention applies also to embodiments of antennas operationally equivalent to those illustrated by FIGS. 25 and 26. This is especially the case for an antenna in which a field-effect transistor (FET) oscillator driven by a dielectric resonator (DRO) is used instead of the transmitter/receiver 10 described earlier. This is also the case for plane microstrip antennas having a number of interconnected radiating elements, whose dimensions and separations allow the radiation of lobes similar to those which are radiated by the slotted waveguide antenna described above.

An advantageous alternative to this system for sensing parallel traffic, according to the present invention, consists in using a unidirectional transmitter/receiver, known per se, instead of the transmitter/receiver 10 illustrated in FIGS. 25 and 26. This unidirectional transmitter/receiver consists for example of a resonant cavity, of a Gunn diode for generating the electromagnetic wave, and of two Schottky diodes which are out of phase by a fraction of the wavelength and constitute two measurement channels. The two signals delivered by the two Schottky diodes are analyzed by a discriminator circuit which, as a function of the phase shift of the signals, makes it possible to distinguish a moving agent which is approaching from a moving agent which is receding. The use of sensors which are sensitive solely to motions of approach is thus possible.

The advantage of this alternative is twofold. Firstly, since slight fluctuations of velocity about the favored direction of sensing are possible, a system with two out-of-phase channels will be more insensitive to these fluctuations for displacements parallel to the axis of the guide and the absence of sensing of parallel traffic will merely perform better. Secondly, such a sensor does not sense moving agents which are receding. In the case of the application to an automatic door, this allows early closure of the latter, this being directed towards energy savings. Indeed, it is not necessary to keep the door open while a person is receding therefrom.

Rather than using a two-channel transmitter/receiver to produce the alternative described above, it is possible also, according to the invention, to use a single-channel transmitter/receiver as illustrated in FIGS. 25 and 26, and to make the second measurement channel from a passive cavity fixed instead of the terminal load and supporting a Schottky diode. This passive cavity has, for example, dimensions of the cavity 10 illustrated in FIGS. 1 to 3 but does not include a Gunn diode. Another way to produce this alternative according to the invention is to use the slotted waveguide antenna such as illustrated in FIGS. 25 and 26, and to implant the second Schottky diode into the waveguide itself, between the last slot and the terminal load.

Figure 39:
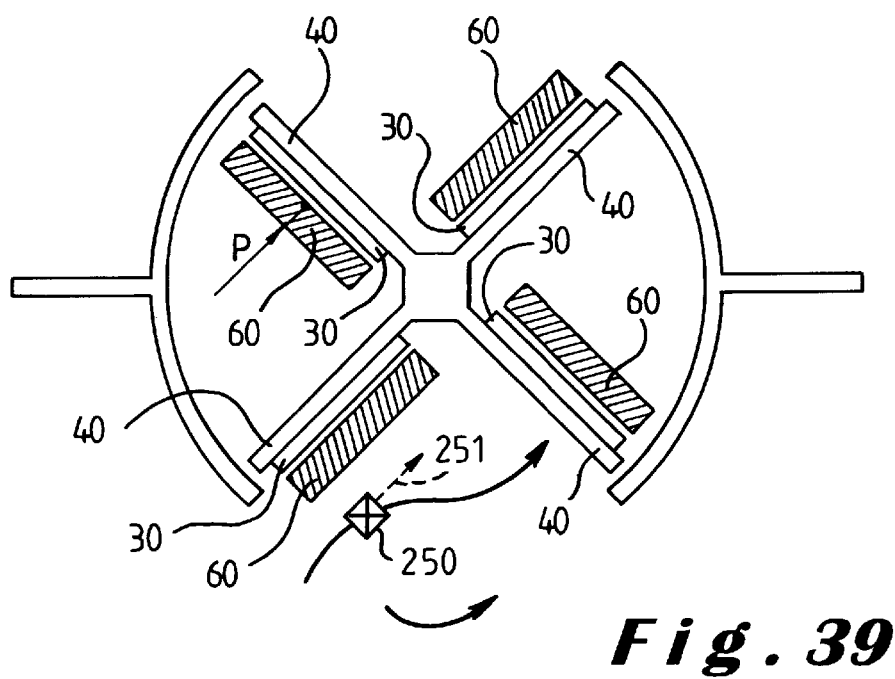
FIG. 39 is a schematic view in transverse section of a revolving door equipped with sensors according to the invention.

It should be pointed out that the sensing device according to the invention can be used in a doubly advantageous manner on the moving leaves 40 of a revolving door, as illustrated in FIG. 39. On the one hand, the depth P of the lobe 60 is reduced by virtue of the invention. On the other hand, the sensor 30 is insensitive to the lateral traffic, that is to say parallel to the plane of the leaf 40. This is favorable insofar as a pedestrian 250, at the moment he steps into an open sector of the door, is possessed of a speed of displacement whose main component 251 is parallel to the plane of the door. Now, it is absolutely desirable to avoid a sensing in this initial phase of the progress of the pedestrian.

In the applications illustrated in FIGS. 11 to 16, as in FIG. 39, the sensor is arranged on the moving part(s) of the automatic door, or on board a vehicle. Whether it be a motion sensor or a presence sensor, a UHF sensor travelling with a moving object sees its environment change relative to itself while it is travelling. It is entirely as if the sensor were fixed and the environment were in relative motion. Under these conditions, the useful signal delivered by the sensor, either the Doppler signal or a signal proportional to the power reflected, varies continuously as a function of the environment. Consequently, it is impossible to fix a sensing threshold representative of an obstacle.

In order to make the use of a motion or presence sensor fixed on a moving device reliable, it is proposed, according to one aspect of the invention, to utilize the sensing signals delivered in the manner described below.

Figure 40:
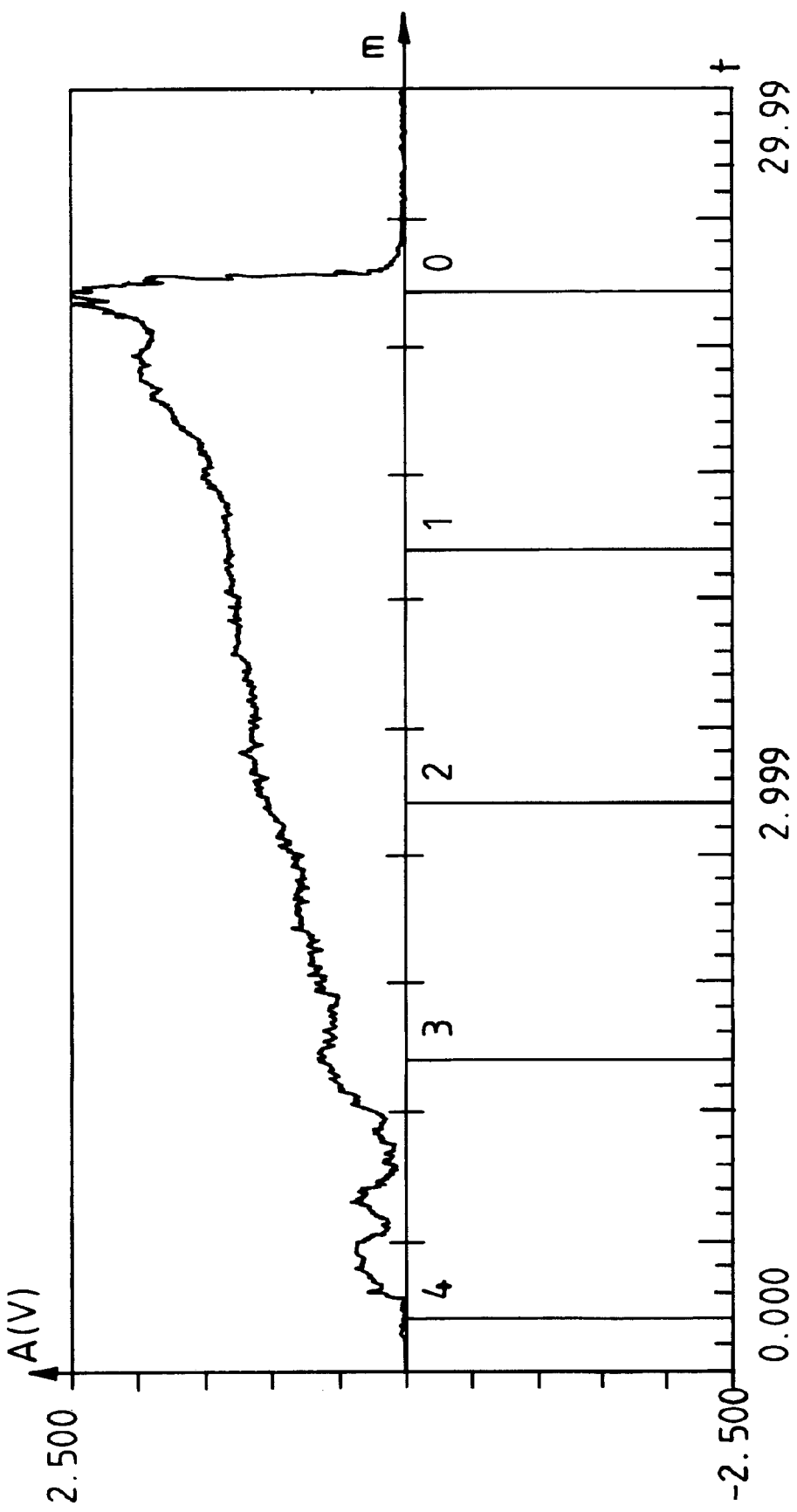
FIG. 40 shows the evolution of the signal delivered by a motion sensor with antenna according to the invention fixed to the lower part of a roller shutter door in the case where no obstacle is present in the sensing field.

A first example application of the process according to the invention relates to protection in the environment of the roller shutter door illustrated in FIGS. 15 and 16. The dangerous motion with this kind of door is the drop, which involves a risk of colliding with a person or object. The lower edge of the shutter door 40 is equipped with a Doppler effect motion sensor 30, furnished with an antenna according to the invention having a sufficient length to ensure good coverage in width. If the evolution of the signal delivered by this sensor is recorded during the motion of the door, between the top (open) position and the bottom (closed) position and in the absence of any obstacle in the sensing field, a sensing signal is obtained as represented in FIG. 40. It is noted that this signal is of increasing amplitude A(V) and corresponds to the relative approach of the environment with respect to the sensor, first distant (left part of the curve) and then closer and closer (right part of the curve). The abscissae are graduated in time (from 0 to 30 seconds). Since the speed of displacement of the roller shutter door is constant, a second scale, proportional to the height of the lower edge of the door with respect to the ground, is also indicated (from 4 m to 0 m).

It is reasonable to imagine a priori that such a type of sensor, mounted on a door in motion and subjected to incessant vibrations, would produce curves of the evolution of the sensing signal which differ from one closure cycle to another. Tests performed under the conditions described earlier have shown on the contrary that the measured curve depicted in FIG. 40 is perfectly repetitive from one closure cycle to another and can, according to the invention, serve as reference for the sensing logic procedure. In other words, the curve depicted in FIG. 40 is the signature of the environment with respect to the sensor and can constitute a reference curve which is used in the process according to the invention.

This process consists in continuously measuring the useful signal delivered by the sensor, for example a Doppler effect UHF sensor with a slotted waveguide antenna, and in comparing the measured value, at a given instant, with the corresponding value of the reference curve stored previously. Any distortion with respect to the reference curve indicates the presence of an obstacle, it being possible to utilize this information to ensure safety in the environment of the door. It is therefore useful, according to the invention, for the system for processing the signal delivered by the sensor to perform a cycle for learning its environment beforehand. For this reason, it is convenient to architecture the signal processing and decision taking system around a microprocessor.

During a learning cycle, the microprocessor, in the case of the roller shutter door illustrated in FIGS. 15 and 16, undertakes the acquisition and storage of the useful signal as a function of time, that is to say as a function of the position of the door and in the absence of any obstacle in its environment. The stored signal has, for example, the shape of the signal illustrated in FIG. 40. If the drop speed of the door is not sufficiently constant, a position detector, known per se, can be used to clock the acquisition of the measurements. If need be, the gain of the signal amplifying chain can be made to vary as a function of the position of the sensor with respect to the environment so as to render the reference curve virtually constant.

Throughout any subsequent motion of the door, the microprocessor compares the value measured at a given instant—hence for a determined position of the door—with the corresponding value of the reference curve. If a distortion is apparent between these two values, this implies that the sensor has detected the presence of an obstacle, and the decision procedure gives rise for example to the arresting of the door, or its raising.

Figure 41:
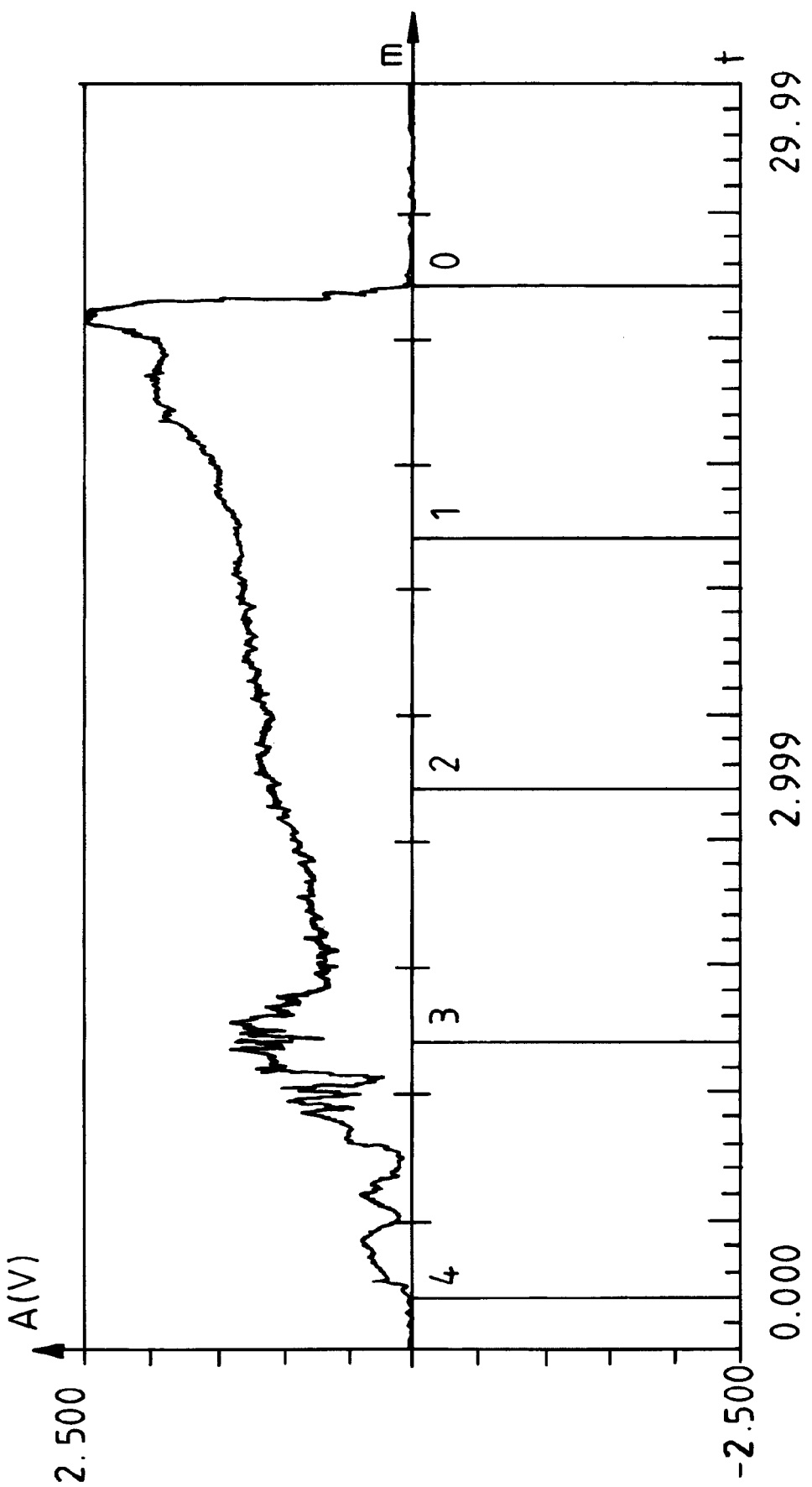
FIG. 41 is similar to FIG. 40, but represents the signal when an aluminum plate is slipped into and then withdrawn from the sensing field, at ground level.
Figure 42:
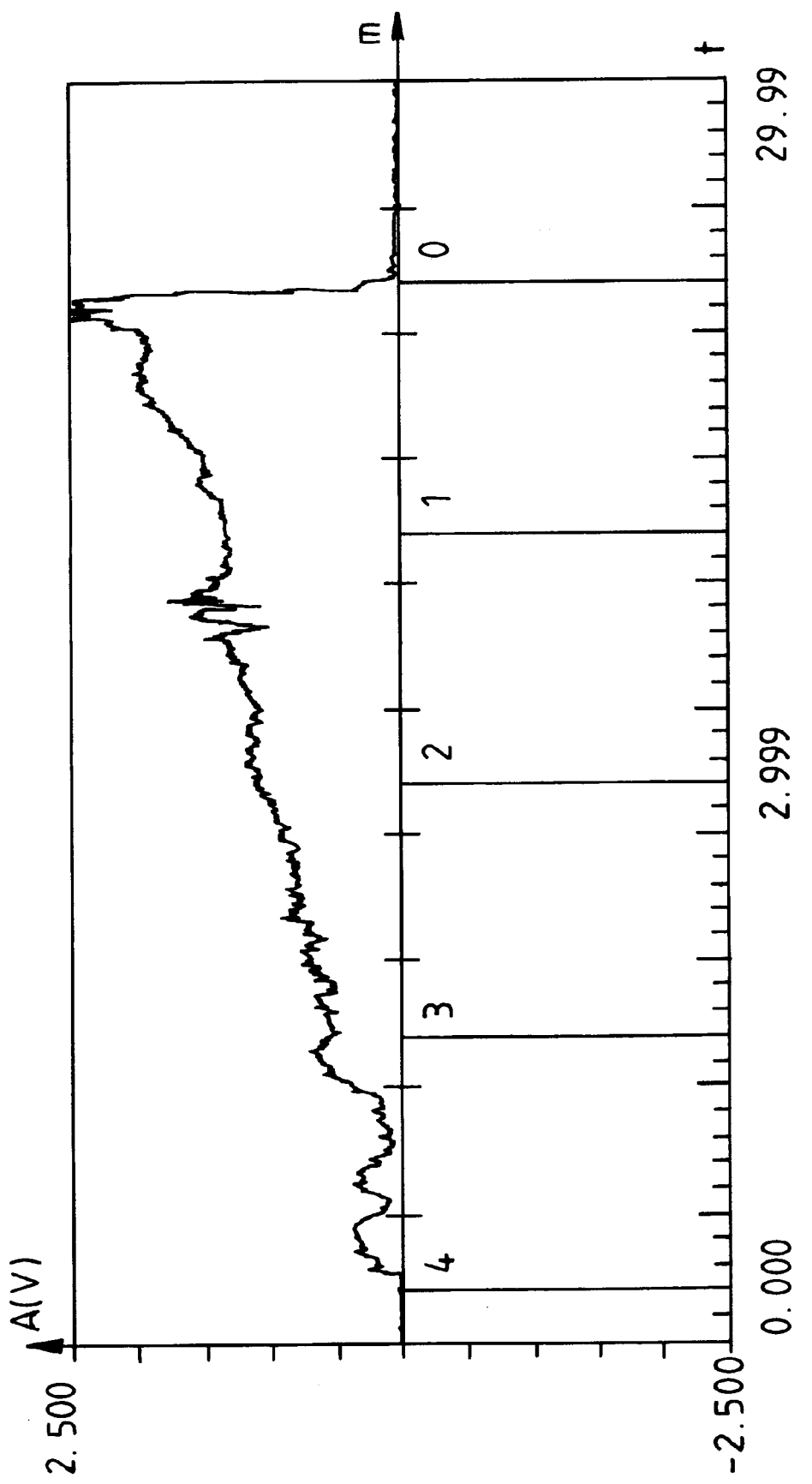
FIG. 42 is similar to FIG. 40, but represents the signal when a hand is slipped into and then withdrawn from the sensing field, at around 1 m from the ground.

This kind of distortion is clearly apparent in the following figures. FIG. 41 shows how an aluminum plate, introduced into and then withdrawn from the sensing field of the sensor protecting the roller shutter door described earlier, affects the measured curve. It is seen that the aluminum plate is already sensed while the door is at a height of around 3.50 m above the ground. This is due to the high reflectivity of the plate. FIG. 42 shows how this same sensor senses a hand introduced and withdrawn from the sensing field at a height of one meter above the ground. It is apparent that the hand is sensed while the door is at a height of around 1.50 m above the ground.

A second example application of the process according to the invention relates to protection in front of the leaves of a revolving door, such as represented in FIGS. 11 and 12. During a complete rotation of the door, the microprocessor undertakes the acquisition and storage of the useful signal as a function of time, that is to say as a function of the angular position of the door and in the absence of any obstacle in its environment. The stored signal has, for example, the shape of the signal A illustrated in FIG. 43. If the speed of rotation of the door is not sufficiently constant, a position detector, known per se, can be used to clock the acquisition of the measurements. For a proper understanding of FIG. 43, it should be pointed out that, for reasons related to the acquisition system used, the ordinate axis is reversed, and has its origin at the level 5.

Throughout any subsequent motion of the door, the microprocessor compares the value measured at a given instant—hence for a determined angular position of the door—with the corresponding value of the reference curve. If a distortion is apparent between these two values, this implies that the sensor has detected the presence of an obstacle, and the decision procedure gives rise for example to the slowing down or arresting of the door. This kind of distortion is clearly apparent in curve B of FIG. 43, which corresponds to the presence of a hand introduced into and later withdrawn from the sensing field of the sensor.

Figure 43:
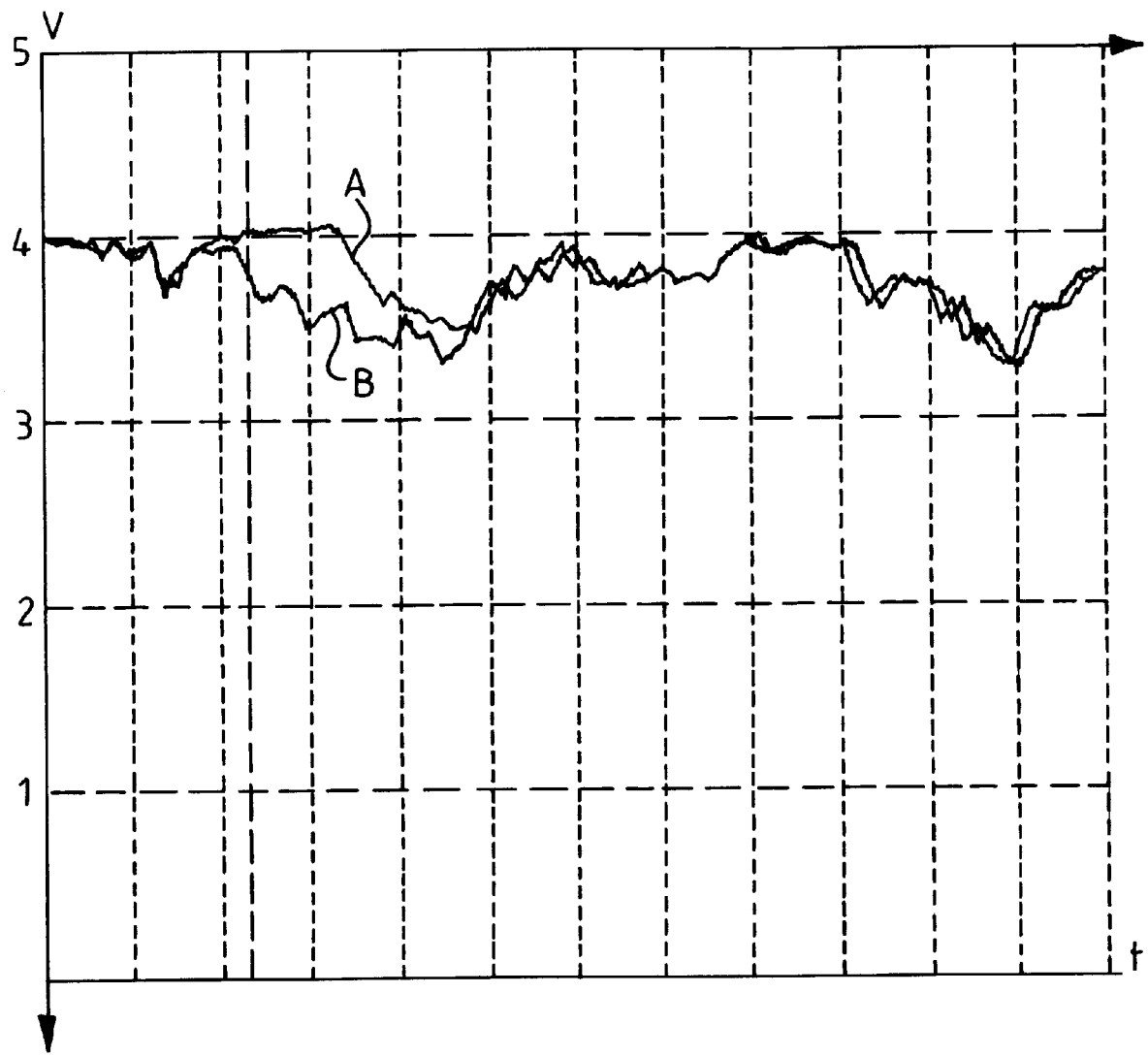
FIG. 43 shows the evolution of the signal delivered by a motion sensor with antenna according to the present invention, fixed to the upper part of a leaf of a revolving door, in the case where no obstacle is present in the sensing field, and in the case where a hand is introduced into and then withdrawn from the sensing field.

The reference curve labeled A in FIG. 43 can, depending on the speed of rotation of the door, be shifted proportionally towards positive or negative ordinates. This is due to the passband of the signal amplifying chain. Profit may advantageously be drawn from this characteristic which depends on the speed of rotation and which can be stored previously. Indeed, in the case of the revolving door which can operate with several speeds of rotation, the previous storing of the reference waves at several speeds makes it possible on the one hand to sense an obstacle with greater accuracy, and on the other hand, to undertake an action on the door as a function of the speed; more or less energetic braking during sensing.

The process according to the invention is not limited to the processing of the signal delivered by a Doppler effect UHF motion sensor furnished with an antenna according to the invention. It can advantageously be used within the framework of measurements made with other types of sensors, such as for example active infrared sensors. In this case, the measured, stored reference signal corresponds to the reflecting of the infrared radiation by the environment, in the absence of any obstacle.

What is claimed is:

1. An electronic device for sensing and protection of a member selected from a group consisting of persons and objects in a sensing lobe associated with an automatic device, said electronic device for sensing and protection comprising a wave transmitter covering a determined spatial sensing field, and a wave receiver for controlling the automatic device; a radiating antenna comprising a waveguide comprising lateral faces, wherein one of the lateral faces includes slots arranged thereon, said slots effectuating radiation in planes substantially perpendicular to a longitudinal direction of the waveguide, wherein the wave transmitter and the wave receiver are arranged at one end of the waveguide; a matched load arranged at an opposite end of the wave guide; substantially identical reflectors arranged over substantially the whole length of the waveguide, said reflectors extending essentially symmetrically with respect to longitudinal plane of symmetry of the waveguide and making a predetermined angle with one another, wherein the waveguide and the reflectors comprise at least one piece.

2. The electronic device as claimed in claim 1, wherein said one of the lateral faces including slots thereon comprises a radiating face, said radiating face comprising a separate piece of said at least one piece.

3. The electronic device as claimed in claim 2, wherein the reflectors are pivotable about an axis parallel to a longitudinal axis of the waveguide.

4. The electronic device as claimed in claim 2, wherein said radiating face comprises a member selected from the group consisting of a metal strip and a metallized epoxy substrate.

5. The electronic device is claimed in claim 4, wherein said slots in said radiating face comprise a member selected from the group consisting of drilled slots and photoengraved slots.

6. The electronic device as claimed in claim 5 wherein said radiating face comprises a metal strip comprising drilled slots.

7. The electronic device as claimed in claim 5, wherein said radiating face comprises a metallized epoxy substrate comprising photoengraved slots.

8. The electronic device as claimed in claim 4, wherein the reflectors are pivotable about an axis parallel to the longitudinal axis of the waveguide.

9. The electronic device as claimed in claim 1, wherein said at least one piece comprises a casing for a sensor, at least a part of the waveguide and the reflectors.

10. The electronic device as claimed in claim 9, wherein the reflectors are pivotable about an axis parallel to a longitudinal axis of the waveguide.

11. The electronic device as claimed in claim 1, wherein the reflectors are pivotable about an axis parallel to a longitudinal axis of the waveguide.

12. The electronic device as claimed in claim 1, wherein said slots are disposed in inclined planes at predetermined positions over a length of the waveguide.

13. The electronic device as claimed in claim 12, wherein the inclination of at least one of said inclined planes is different from the inclination of other inclined planes.

14. The electronic device as claimed in claim 13, wherein said inclinations vary over the length of said waveguide.

15. The electronic device as claimed in claim 13, wherein variation in the inclinations of the slots takes place per group of a plurality of slots.

16. The electronic device as claimed in claim 1, wherein said at least one piece comprise two pieces.

17. The electronic device as claimed in claim 1, wherein said at least one piece comprises an extruded piece.

18. A process for sensing a member selected from a group consisting of persons, animate objects and inanimate objects in a sensing lobe associated with a movable automatic device by means of a sensor installed on the movable device so as to cover a determined spatial sensing field and produce a sensing signal, said process comprising the following steps:

measuring said sensing signal as a function of motion of a movable automatic device in the absence of any obstacle, storing an evolution of said sensing signal in an electronic memory in order to serve as a reference curve, measuring a value of the sensing signal continuously as a measured value and comparing the measured value with a corresponding value of said reference curve, using a deviation between the measured value of said sensing signal and the corresponding value of the reference curve to indicate a presence of an obstacle formed by a member selected from the group consisting of persons, animate objects and inanimate objects in the sensing field.

19. The process for sensing as claimed in claim 18, wherein the sensing signal is captured and stored as a function of time.

* * * * *